(12) United States Patent
Wei et al.

(10) Patent No.: US 12,303,781 B2
(45) Date of Patent: May 20, 2025

(54) VIRTUAL OBJECT CONTROL METHOD AND APPARATUS, TERMINAL, AND STORAGE MEDIUM

(71) Applicant: Tencent Technology (Shenzhen) Company Limited, Guangdong (CN)

(72) Inventors: Jiacheng Wei, Shenzhen (CN); Xun Hu, Shenzhen (CN); Shandong Su, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 483 days.

(21) Appl. No.: 17/501,024

(22) Filed: Oct. 14, 2021

(65) Prior Publication Data

US 2022/0032183 A1 Feb. 3, 2022

Related U.S. Application Data

(63) Continuation of application No. PCT/CN2021/090301, filed on Apr. 27, 2021.

(30) Foreign Application Priority Data

May 14, 2020 (CN) .......................... 202010408457.1

(51) Int. Cl.
  *A63F 13/426* (2014.01)
  *A63F 13/2145* (2014.01)
  (Continued)

(52) U.S. Cl.
  CPC ........ *A63F 13/426* (2014.09); *A63F 13/2145* (2014.09); *A63F 13/533* (2014.09);
  (Continued)

(58) Field of Classification Search
  CPC .. A63F 13/426; A63F 13/2145; A63F 13/533; A63F 13/5378; A63F 13/822; A63F 2300/638; G06F 3/0486
  See application file for complete search history.

(56) References Cited

U.S. PATENT DOCUMENTS

2009/0241038 A1 9/2009 Izuno et al.
2014/0256389 A1 9/2014 Wentling et al.
(Continued)

FOREIGN PATENT DOCUMENTS

CN 109513209 A 3/2019
CN 109550241 A 4/2019
(Continued)

OTHER PUBLICATIONS

International Search Report issued Jul. 30, 2021, in PCT/CN2021/090301, (5 pages).
(Continued)

*Primary Examiner* — Thomas H Henry
(74) *Attorney, Agent, or Firm* — ArentFox Schiff LLP

(57) ABSTRACT

A virtual object control method is described. A skill type of a skill is obtained in response to a first click/tap operation on a skill control. In response to determining that the obtained skill type of the skill is a target skill that supports selecting a casting position based on a screen click/tap, a castable region of the skill in a virtual scene is displayed according to a position where a controlled virtual object is located and a casting range of the skill. In response to a second click/tap operation in the castable region, the controlled virtual object is controlled to cast the skill at a casting position indicated by the second click/tap operation. Thus, a complex drag operation based on a wheel virtual joystick need not be performed, simplifying the operation of accurate aiming by (Continued)

a user. Apparatus and non-transitory computer-readable counterpart embodiments are also provided.

20 Claims, 8 Drawing Sheets

(51) Int. Cl.
*A63F 13/533* (2014.01)
*A63F 13/5378* (2014.01)
*A63F 13/822* (2014.01)
*G06F 3/0486* (2013.01)
*G06F 3/0488* (2022.01)

(52) U.S. Cl.
CPC ........ *A63F 13/5378* (2014.09); *A63F 13/822* (2014.09); *G06F 3/0486* (2013.01); *G06F 3/0488* (2013.01); *A63F 2300/638* (2013.01)

(56) References Cited

U.S. PATENT DOCUMENTS

| | | | |
|---|---|---|---|
| 2014/0364214 A1 | 12/2014 | Ayoub et al. | |
| 2016/0129345 A1* | 5/2016 | Seok | A63F 13/213 463/31 |
| 2016/0199728 A1 | 7/2016 | Yoon | |
| 2018/0043254 A1 | 2/2018 | Soejima et al. | |
| 2018/0121086 A1* | 5/2018 | Wang | A63F 13/426 |
| 2018/0304158 A1* | 10/2018 | Miyamae | A63F 13/533 |
| 2019/0303201 A1* | 10/2019 | Jiang | A63F 13/35 |
| 2021/0008458 A1* | 1/2021 | Wang | A63F 13/46 |

FOREIGN PATENT DOCUMENTS

| | | |
|---|---|---|
| CN | 110292778 A | 10/2019 |
| CN | 110624241 A | 12/2019 |
| CN | 110694261 A | 1/2020 |
| CN | 111589140 A | 8/2020 |

OTHER PUBLICATIONS

Written Opinion issued Jul. 30, 2021, in PCT/CN2021/090301 (5 pages).
Supplementary European Search Report issued Jun. 10, 2022 in Application No. 21783380.5.
Deluxe345: "Shadow Tactics: Blades of the Shogun I PC Gameplay I HD 1440P", Dec. 8, 2016.
Japanese Office Action issued Jan. 10, 2022 in Application No. 2021-564931 with English Translation, pp. 1-7.
"League of Legends Strategy Note" [online], Mar. 5, 2016, Internet <URL: https://lolwiki-note.info/data/7>, pp. 1-9.
"[LoL] 0-1-2 course Step 4] Various "skills" for each champion Let's understand" [online], Oct. 30, 2019, Internet URL <https://esports-world.jp/column/2670>, pp. 1-20.
[Mobile Legend] Cheats for intermediate players, Torobro [online], Aug. 23, 2019, [Retrieved on May 2, 2022], Internet URL <http://trokiss-gamer.com/smartphone-game/no-224/>, pp. 1-12.
Korean Office Action issued Oct. 17, 2023 in Application No. 10-2021-7035426 with English Translation, pp. 1-39.
Gaming Theos, Perfect Use of Mini Map | Map Awareness & Farming Guide | Mobile Legends Bang Bang, YouTube-published video, Mar. 24, 2019, <https:////www.youtube.com /watch?V=jq35rGBhpns>.
FA King of Glory is in trouble, [Required Course for FA King] 55_Take it away with one hook! What is the correct posture for Baili Xuance's combo?, Sep. 6, 2017, https://www.bilibili.com/video/BV11x411x7ML/?spm_id_from=333.337.search-card.all.click.
Office Action received for Korean Patent Application No. 10-2021-7035426, mailed on Jun. 19, 2024, 17 pages (3 pages of English Translation and 14 pages of Original Document).
"Final Fantasy XI game Manual", Square Enix, Available on internet at: <https://web.archive.org/web/20160318163225/http://www.playonline.com/ff11/manual/index.html?loc=ja#051900>, Mar. 18, 2016, pp. 1-7 (Original Document Only).
Office Action received for Japanese Patent Application No. 2023-180873, mailed on Mar. 25, 2025, 11 pages (7 pages of English Translation and 4 pages of Original Document).

* cited by examiner

VIRTUAL OBJECT CONTROL METHOD AND APPARATUS, TERMINAL, AND STORAGE MEDIUM

RELATED APPLICATIONS

This application is a continuation application of International Application No. PCT/CN2021/090301 entitled "VIRTUAL OBJECT CONTROL METHOD AND APPARATUS, TERMINAL, AND STORAGE MEDIUM," and filed on Apr. 27, 2021, which claims priority to Chinese Patent Application No. 202010408457.1, entitled "VIRTUAL OBJECT CONTROL METHOD AND APPARATUS, TERMINAL, AND STORAGE MEDIUM," and filed on May 14, 2020. The entire disclosures of the above-identified prior applications are incorporated herein by reference in their entireties.

FIELD OF THE TECHNOLOGY

This application relates to the field of human-computer interaction, including a virtual object control method and apparatus, a terminal, and a storage medium.

BACKGROUND OF THE DISCLOSURE

With the development of computer technologies and the diversification of terminal functions, increasing mobile phone games occur, where a multiplayer online battle arena (MOBA) game gradually becomes an extremely important game of the mobile phone games. In the current MOBA games, players can control a target virtual object to cast a skill to a certain position to trigger an effect of the skill at this position.

Generally, when a player casts a skill, a skill control needs to be clicked/tapped first, the skill control triggers the display of a wheel virtual joystick, and a wheel part on the wheel virtual joystick has a mapping relationship with a casting range of the skill in a virtual scene. Then, a joystick part in the wheel virtual joystick is dragged to adjust a casting direction and a casting position of the skill in the casting range. After the adjustment is completed, the player can cast the skill at a position mapped by the joystick part in the virtual scene by releasing.

According to the foregoing casting method based on the wheel virtual joystick, since the wheel virtual joystick has a mapping relationship with the casting range, and the size of the wheel virtual joystick is usually unchanged, for some skills with a larger casting range, a mapping ratio is excessively large. When the player is dragging the joystick part, even a slight movement causes a final casting position to shift in a large range, resulting in low aiming accuracy. The user needs to perform a plurality of aiming operations for accurate aiming, and a terminal needs to receive the plurality of aiming operations from the user. The casting position mapped by the aiming operation in the virtual scene is repeatedly calculated, resulting in an excessively large calculation amount and an increased load of the terminal.

SUMMARY

Embodiments of this disclosure provide a virtual object control method and apparatus, a terminal, and a storage medium, which can improve the aiming accuracy of casting skills in MOBA, simplify the operation of accurate aiming by a user, reduce the calculation amount of the terminal during aiming, and reduce the load of the terminal. The technical solutions are as follows.

According to an aspect, a virtual object control method is provided, applicable to a terminal, the method including: (1) obtaining a skill type of a skill in response to a first click/tap operation on a skill control; (2) displaying, in response to determining that the obtained skill type of the skill is a target skill, a castable region of the skill in a virtual scene according to a position where a controlled virtual object is located and a casting range of the skill, the target skill being a skill that supports selecting a casting position based on a screen click/tap; and (3) controlling, in response to a second click/tap operation in the castable region, the controlled virtual object to cast the skill at a casting position indicated by the second click/tap operation.

According to an aspect, a virtual object control apparatus is provided, including: circuitry configured to (1) obtain a skill type of a skill in response to a first click/tap operation on a skill control; (2) cause to be displayed, in response to determining that the skill type of the skill is a target skill, a castable region of the skill in a virtual scene according to a position where a controlled virtual object is located and a casting range of the skill, the target skill being a skill that supports selecting a casting position based on a screen click/tap; and (3) control, in response to a second click/tap operation in the castable region, the controlled virtual object to cast the skill at a casting position indicated by the second click/tap operation.

According to an aspect, a terminal is provided, including one or more processors and one or more memories, the one or more memories storing at least one program code, the at least one program code being loaded and executed by the one or more processors to implement the operations performed in the virtual object control method according to any one of the foregoing implementations.

According to an aspect, a non-transitory computer-readable storage medium is provided, storing at least one program code, the at least one program code being loaded and executed by processing circuitry to implement the operations performed in the virtual object control method according to any one of the foregoing implementations.

According to an aspect, a computer program product or a computer program is provided, including computer instructions, the computer instructions being stored in a computer-readable storage medium. A processor of a computer device reads the computer instructions from the computer-readable storage medium, and executes the computer instructions, so that the computer device performs the virtual object control method provided in the foregoing implementations.

The technical solutions provided in the embodiments of this disclosure include at least the following beneficial effects:

A castable region of a skill is displayed in a virtual scene by receiving an operation of clicking/tapping a skill control. A selected casting position is determined by receiving a click/tap operation on the castable region, and a controlled virtual object is controlled to cast the skill at the casting position. Based on the human-computer interaction method of first clicking/tapping the skill control and then clicking/tapping the casting position in the virtual scene to cast the skill, the casting position of the skill can be directly selected in the virtual scene without mapping between a wheel virtual joystick and the casting position, an offset error produced when the wheel virtual joystick is mapped into the casting position is avoided, and the casting position of the skill can be accurately selected through visual observation on the virtual scene. Therefore, this method has a higher aiming accuracy and a lower operation difficulty, resulting in more efficient human-computer interaction. The quantity of operations for accurate aiming is reduced, the quantity of invalid or inaccurate aiming operations received by a terminal during the aiming is reduced, the time needed for aiming operations is shortened, the terminal no longer needs to calculate casting positions respectively mapped by the invalid or inaccurate aiming operations, the calculation amount of calculating the casting positions mapped by the aiming operations by the terminal during the aiming, the load of the terminal is reduced, and the computing efficiency of the terminal in skill aiming and casting is improved.

DESCRIPTION OF EMBODIMENTS

Figure 1:
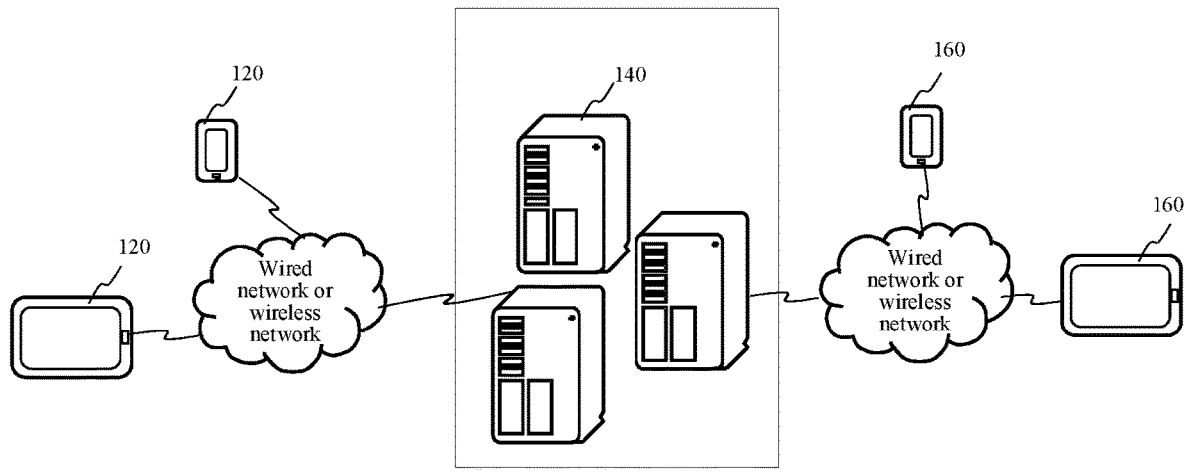
FIG. 1 is a schematic diagram of an implementation environment of a virtual object control method according to an embodiment of this disclosure.

To make objectives, technical solutions, and advantages of this disclosure clearer, the following further describes implementations of this disclosure in detail with reference to the accompanying drawings.

The terms "first", "second", and the like in this disclosure are used for distinguishing between same items or similar items of which effects and functions are basically the same. The "first", "second", and "nth" do not have a dependency relationship in logic or time sequence, and a quantity and an execution order thereof are not limited.

The term "at least one" in this disclosure means one or more and "a plurality of" means two or more. For example, a plurality of first positions means two or more first positions.

For ease of understanding the technical solutions in the embodiments of this disclosure, some terms involved in the embodiments of this application are explained below.

Virtual scene: a virtual scene displayed (or provided) when an application program is run on a terminal. The virtual scene may be a simulated environment of a real world, or may be a semi-simulated semi-fictional virtual world, or may be an entirely fictional virtual environment. The virtual scene may be any one of a two-dimensional virtual scene, a 2.5-dimensional virtual scene, or a three-dimensional virtual scene, and the dimension of the virtual scene is not limited in the embodiments of this disclosure. For example, the virtual scene may include the sky, the land, the ocean, or the like. The land may include environmental elements such as the desert and a city. The user may control the virtual object to move in the virtual scene. Further, the virtual scene may be further used for a virtual scene battle between at least two virtual objects, and there are virtual resources available to the at least two virtual objects in the virtual scene. Further, the virtual scene may include two symmetric regions, virtual objects on two opposing camps occupy the regions respectively, and a goal of each side is to destroy a target building/fort/base/crystal deep in the opponent's region to win victory. For example, the symmetric regions are a lower left corner region and an upper right corner region, or a middle left region and a middle right region.

Virtual object: a movable object in a virtual scene. The movable object may be a virtual character, a virtual animal, a cartoon character, or the like, for example, a character, an animal, a plant, an oil drum, a wall, or a stone displayed in a virtual scene. The virtual object may be a virtual image used for representing a user in the virtual scene. The virtual scene may include a plurality of virtual objects, each virtual object has a shape and a volume in the virtual scene, and occupies some space in the virtual scene. Further, when the virtual scene is a three-dimensional virtual scene, the virtual object may be a three-dimensional model, the three-dimensional model may be a three-dimensional character constructed based on a three-dimensional human skeleton technology, and the same virtual object may show different appearances by wearing different skins. In some embodiments, the virtual objects may be alternatively implemented by using a 2.5-dimensional model or a two-dimensional model. This is not limited in the embodiments of this disclosure.

Further, the virtual object may be a player character controlled through an operation on a client, or may be an artificial intelligence (AI) character set in a virtual scene battle through training, or may be a non-player character (NPC) set in a virtual scene interaction. In addition, the virtual object may be a virtual character for competition in a virtual scene. Further, a quantity of virtual objects participating in the interaction in the virtual scene may be preset, or may be dynamically determined according to a quantity of clients participating in the interaction.

A MOBA game is a game in which several forts are provided in a virtual scene, and users on different camps control virtual objects to battle in the virtual scene, occupy forts or destroy forts of the opposing camp. For example, a MOBA game may divide users into at least two opposing camps, and different virtual teams on the at least two opposing camps occupy respective map regions, and compete against each other using specific victory conditions as goals. The victory conditions include, but are not limited to at least one of occupying forts or destroy forts of the opposing camps, killing virtual objects in the opposing camps, ensure own survivals in a specified scenario and time, seizing a specific resource, and outscoring the opponent within a specified time. For example, in the MOBA game, the users may be divided into two opposing camps. The virtual objects controlled by the users are scattered in the virtual scene to compete against each other, and the victory condition is to destroy or occupy all enemy forts.

Further, each virtual team includes one or more virtual objects, such as 1, 2, 3, or 5. According to a quantity of virtual objects in each team participating in the battle arena, the battle arena may be divided into 1V1 competition, 2V2 competition, 3V3 competition, 5V5 competition, and the like. 1V1 means "1 vs. 1", and details are not described herein.

Further, the MOBA game may take place in rounds (or turns), and each round of the battle arena may have the same map or different maps. A duration of one round of the MOBA game is from a moment at which the game starts to a movement at which the victory condition is met.

In the MOBA game, a user may control a virtual object to fall freely, glide, parachute, or the like in the sky of the virtual scene, or to run, jump, crawl, walk in a stooped posture, or the like on the land, or may control a virtual object to swim, float, dive, or the like in the ocean. Herein, the scenes are merely used as examples, and no specific limitations are set in the embodiments of this disclosure.

In the MOBA games, users may further control the virtual objects to cast skills to fight with other virtual objects. For example, the skill types of the skills may include an attack skill, a defense skill, a healing skill, an auxiliary skill, a beheading skill, and the like. Each virtual object may have one or more fixed skills, and different virtual objects generally have different skills, and different skills may produce different effects. For example, if an attack skill cast by a virtual object hits a hostile virtual object, certain damage is caused to the hostile virtual object, which is generally shown as deducting a part of virtual health points of the hostile virtual object. In another example, if a healing skill cast by a virtual object hits a friendly virtual object, certain healing is produced for the friendly virtual object, which is generally shown as restoring a part of virtual health points of the friendly virtual object, and all other types of skills may produce corresponding effects. Details are not described herein again.

The following describes a system architecture related to this disclosure.

FIG. 1 is a schematic diagram of an implementation environment of a virtual object control method according to an embodiment of this disclosure. Referring to FIG. 1, the implementation environment includes: a first terminal 120, a server 140, and a second terminal 160.

An application program supporting a virtual scene is installed and run on the first terminal 120. The application program may be any one of a MOBA game, a massively multiplayer online role playing game (MMORPG), a first-person shooting (FPS) game, a third-person shooting game, a virtual reality application program, a three-dimensional map program, a military simulation program, or a multiplayer gunfight survival game. The first terminal 120 may be a terminal used by a first user, and the first user uses the first terminal 120 to operate a first virtual object in the virtual scene to perform a movement. The movement includes, but is not limited to, at least one of skill casting, body posture adjustment, crawling, walking, running, cycling, jumping, driving, picking-up, shooting, attacking, and throwing. For example, the first virtual object is a first virtual character such as a simulated character role or a cartoon character role.

The server 140 may include at least one of one server, a plurality of servers, a cloud computing platform, and a virtualization center. The server 140 is configured to provide a backend service for an application program supporting a virtual scene. Further, the server 140 may take on primary computing work, and the first terminal 120 and the second terminal 160 may take on secondary computing work; alternatively, the server 140 takes on secondary computing work, and the first terminal 120 and the second terminal 160 take on primary computing work; alternatively, collaborative computing is performed by using a distributed computing architecture among the server 140, the first terminal 120, and the second terminal 160.

An application program supporting a virtual scene is installed and run on the second terminal 160. The application may be any one of a MOBA game, an MMORPG, an FPS game, a third-person shooting game, a virtual reality application program, a three-dimensional map program, a military simulation program, or a multiplayer gunfight survival game. The second terminal 160 may be a terminal used by a second user, and the second user uses the second terminal 160 to operate a second virtual object in the virtual scene to perform a movement. The movement includes, but is not limited to, at least one of skill casting, body posture adjustment, crawling, walking, running, cycling, jumping, driving, picking-up, shooting, attacking, and throwing. For example, the second virtual object is a second virtual character, such as a simulated character role or a cartoon character role.

The first terminal 120 and the second terminal 160 may be directly or indirectly connected to the server 140 in a wired or wireless communication manner. The connection manner is not limited in the embodiments of this disclosure.

In some embodiments, the first virtual object controlled by the first terminal 120 and the second virtual object controlled by the second terminal 160 are located in the same virtual scene, and in this case, the first virtual object may interact with the second virtual object in the virtual scene. The first virtual object and the second virtual object may be in an opposing relationship, for example, the first virtual object and the second virtual object may belong to different teams and camps. The virtual objects in the opposing relationship may battle against each other by casting skills, for example, the first virtual object casts an attack skill to the second virtual object. In some other embodiments, the first virtual object and the second virtual object may be teammates, for example, the first virtual character and the second virtual character may belong to the same team or the same organization, and have a friend relationship with each other or have a temporary communication permission. In this case, the first virtual object may cast a treatment skill to the second virtual object.

The server 140 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform.

The first terminal 120 or the second terminal 160 may be a smartphone, a tablet computer, a notebook computer, a desktop computer, a smart speaker, a smartwatch, a Moving Picture Experts Group Audio Layer III (MP3) player, a Moving Picture Experts Group Audio Layer IV (MP4) player, an e-book reader, or the like, but is not limited thereto.

The application programs installed on the first terminal 120 and the second terminal 160 may the same, or the application programs installed on the two terminals are the same type of application programs on different operating system platforms. The first terminal 120 may be generally one of a plurality of terminals, and the second terminal 160 may be generally one of a plurality of terminals. In this embodiment, only the first terminal 120 and the second terminal 160 are used for description. The device types of the first terminal 120 and the second terminal 160 may be the same or different. A person skilled in the art may learn that there may be more or fewer terminals. For example, there may be only one terminal, or there may be dozens of or hundreds of terminals or more. The quantity and the device type of the terminal are not limited in the embodiments of this disclosure.

Figure 2:
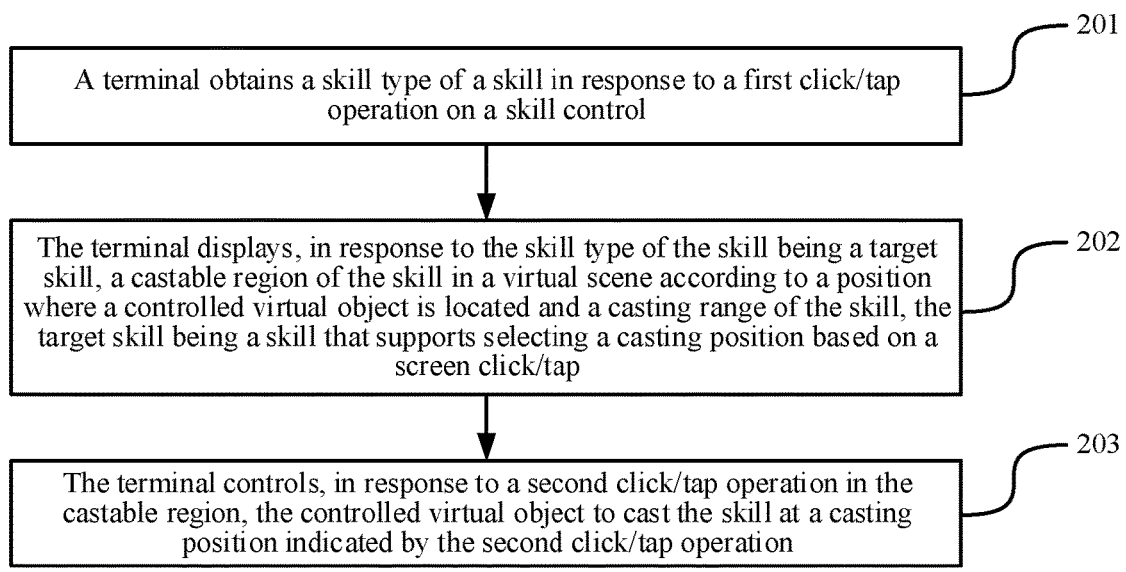
FIG. 2 is a flowchart of a virtual object control method according to an embodiment of this disclosure.

FIG. 2 is a flowchart of a virtual object control method according to an embodiment of this disclosure. Referring to FIG. 2, this embodiment is applied to a terminal, and the terminal may be the first terminal 120 or the second terminal 160 shown in FIG. 1. This embodiment includes the following steps.

In step 201, a terminal obtains a skill type of a skill in response to a first click/tap operation on a skill control.

The terminal may be a terminal used by any user. A virtual object currently controlled by the terminal is a controlled virtual object, and the controlled virtual object may fight against other virtual objects in a virtual scene by casting skills. The skills involved herein may one or more skills inherent to the controlled virtual object, or the skills may be one or more skills cast by the controlled virtual object using a certain virtual prop after the virtual prop is equipped. Skill resources are not specifically limited in the embodiments of this disclosure. Further, the skill type of the skill may include an attack skill, a defense skill, a treatment skill, an auxiliary skill, a beheading skill, and the like. Skill types are not specifically limited in the embodiments of this disclosure.

In some embodiments, the terminal displays a round start interface in response to a round start operation of the user. The round start interface may include a virtual object selection control, a virtual prop selection control, and the like. The round start operation is used for triggering a start of a round of game, and may be a click/tap operation on a round start control. Types of the round start operation are not limited in the embodiments of this disclosure. The round start interface is used for selecting the controlled virtual object of this round. The terminal may detect in real time a selection operation of the user on each virtual object in the round start interface, and determine the selected virtual object as the controlled virtual object to play in this round. Further, the selection operation may be a click/tap operation, a long-press operation, or the like, or may be a trigger operation on a shortcut key corresponding to any virtual object. This is not limited in the embodiments of this disclosure. In some MOBA games, the user may select a plurality of virtual objects to play at a time, and control the plurality of virtual objects to play in the game round at the same time. Therefore, the controlled virtual object in the embodiments of this disclosure refers to the virtual object currently controlled by the user, which is commonly referred to as the "main controlled virtual object".

After the user selects a controlled virtual object in a round start interface, the terminal starts this round of the game, loads a virtual scene, displays a virtual scene picture of the virtual scene and a skill control of at least one skill possessed by the controlled virtual object, and displays the controlled virtual object in the virtual scene. For example, the skill control is displayed on an upper layer of the virtual scene picture of the virtual scene, that is, the skill control obscures a part of the virtual scene picture.

In one implementation, the terminal displays a user interface (UI), the UI includes the virtual scene picture and the skill control, and the virtual scene picture is a picture obtained by observing the virtual scene with the controlled virtual object as an observation object.

The skill control is used to provide a user interaction interface for skills. For example, the skill control may be displayed floating on the UI in the form of a graphic button, and the graphic button may be a round button, a rectangular button, or an irregularly shaped button. Display modes of the skill control are not specifically limited in the embodiments of this disclosure. Further, a skill identifier of a corresponding skill may be displayed on the skill control, and the skill identifier may be an identification pattern, or a string of identification text, or a string of identification code.

In some embodiments, the terminal may also display other UI controls in the virtual scene, such as a map control, a store control, and a mobile joystick. The content of the controls displayed in the virtual scene is not specifically limited in the embodiments of this disclosure. In the embodiments of this disclosure, UI controls other than skill controls are referred to as "non-skill controls."

The map control, also referred to as a full map radar display control, is an information display control used to display a real-time position of each virtual unit in a virtual environment, so that the user can obtain positions of other virtual units by observing the map control. The map control displays a top view map of the virtual scene, that is, a minimap. The minimap is convenient for the user to observe topographic features of the virtual scene. The minimap further displays map markers of main virtual units, and the map marker is used to mark the real-time position of the virtual unit on the minimap. The main virtual units include at least one of a virtual object, a virtual building, a virtual vehicle, a virtual animal, a virtual prop, and an NPC. For example, the virtual object is a virtual unit controlled by a user or AI. For example, the virtual animal includes a virtual monster.

The user may click/tap a skill control of any skill to make the terminal obtain a skill type of the skill in response to a first click/tap operation of the user on the skill control. The skill type may include a target skill and skills other than the target skill, and the target skill is a skill that supports selecting a casting position based on a screen click/tap. The foregoing process may be regarded as a process of detecting whether the skill type of the skill is the target skill. The terminal may add a target skill identifier for the skill type of the target skill, so that whether the skill type of the skill is the target skill can be determined by detecting whether the skill type of the skill has the target skill identifier. When it is detected that the skill type of the skill has the target skill identifier, the skill type of the skill is determined as the target skill, and the following step 202 is performed. Otherwise, when it is detected that the skill type of the skill does not have the target skill identifier, it is determined that the skill type of the skill is not the target skill, and the process is exited. Further, the target skill identifier may be the IsFullScreenSkill identifier. The target skill may be cast by triggering a click/tap operation on the entire screen of the terminal, and this casting method is different from the operation mechanism based on a wheel virtual joystick in the related art. Therefore, the target skill may also be commonly referred to as a "full-screen skill" or a "touch-screen skill".

Figure 3:
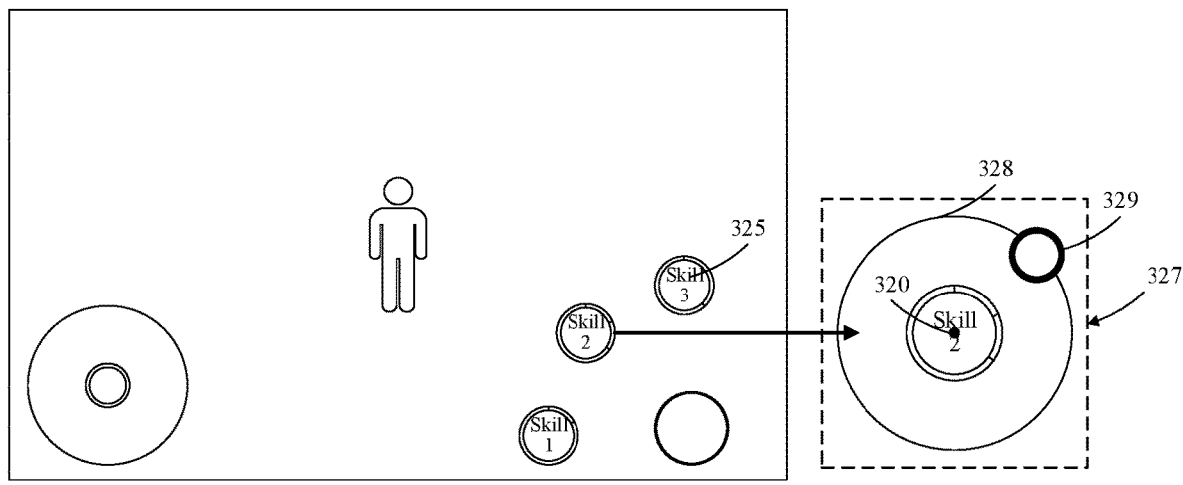
FIG. 3 is a schematic diagram of a wheel virtual joystick according to an embodiment of this disclosure.

For example, the skill control is a wheel virtual joystick control. As shown in FIG. 3, a round skill control 325 is displayed on a first UI. A user may invoke a wheel virtual joystick 327 of the skill control by pressing and holding the skill control 325. The wheel virtual joystick is composed of a big circle 328 (a wheel part) and a small circle 329 (a remote sensing part). The big circle 328 is an operable range of the wheel virtual joystick, and the small circle 329 is a position currently pressed by a finger of the user. The user may slide the small circle 329 within the range of the big circle 328 arbitrarily. For example, the wheel virtual joystick is a direction joystick or a position joystick. The wheel virtual joystick determines a direction or a position of a user according to the direction or the position of the small circle 329 offset from a center point 320 of the virtual joystick, determines an aiming direction or position in the virtual scene according to the direction or the position, and then controls the controlled virtual object to cast the skill at the aiming direction or position in the virtual scene when the user releases the wheel virtual joystick at the position where the small circle 329 is currently located. For example, the operation of the user casting the skill by operating the skill control is to: press and hold the skill control to invoke the wheel virtual joystick, drag the wheel virtual joystick to the target direction or target position, and release the wheel virtual joystick to cast the skill.

In the related art, when a user casts a skill, a skill control needs to be clicked/tapped first, the skill control triggers the display of a wheel virtual joystick, and a wheel part on the wheel virtual joystick has a mapping relationship with a casting range of the skill in a virtual scene. Then, a joystick part in the wheel virtual joystick is dragged to adjust a casting direction or a casting position of the skill in the casting range. After the adjustment is completed, the user can cast the skill at a position mapped by the joystick part by releasing. According to the casting method based on the wheel virtual joystick, since the wheel virtual joystick has a mapping relationship with the casting range, and the size of the wheel virtual joystick is usually unchanged, for some skills with a larger casting range, a mapping ratio is excessively large. When the user is dragging the joystick part, even a slight movement causes a final casting position to shift in a large range, resulting in a low aiming accuracy, a large operation difficulty, and a low human-computer interaction efficiency, consequently affecting user experience.

However, in the embodiments of this disclosure, a target skill does not need to be cast based on a wheel virtual joystick, but is a skill that can select a casting position directly based on a click/tap operation on a screen by a user. The user can directly click/tap a certain casting position in a virtual scene to cast the skill to achieve an interaction effect of "what you see is what you get" without mapping between the wheel virtual joystick and the virtual scene. Therefore, even for some skills with a larger casting range, a good aiming accuracy can be kept, that is, the aiming accuracy of casting skills can be greatly improved, and the operation difficulty of casting skills can be reduced, thereby improving the human-computer interaction efficiency and optimizing the user experience. The following describes how to cast a target skill in detail.

In step 202, the terminal displays, in response to the skill type of the skill being a target skill, a castable region of the skill in a virtual scene according to a position where a controlled virtual object is located and a casting range of the skill, the target skill being a skill that supports selecting a casting position based on a screen click/tap.

In the foregoing process, when it is detected that the skill type of the skill is the target skill, the terminal may determine the position where the controlled virtual object is located as a center of the castable region, and determine a farthest casting distance of the skill as a radius of the castable region, thereby determining a round castable region. For example, the user clicks/taps a skill 1, and the casting range of the skill 1 is six feet. Therefore, in the virtual scene, a six-foot round region around the position of the controlled virtual object is determined as the castable region of the skill 1.

In some embodiments, the terminal may also display a casting template of the castable region in the virtual scene, and the casting template is used for indicating that casting of the skill in a region outside the casting template is invalid. In this case, if a click/tap operation of the user on a position point on the screen is detected, the terminal may determine whether the position point is in the castable region by detecting whether the position point is in the casting template. Specifically, when the position point is in the casting template, it is determined that the position point is in the castable region, and the following step 203 is performed; otherwise, when the position point is not in the casting template, it is determined that the position point is outside the castable region, the skill is not cast, and the click/tap operation is regarded as an invalid operation or a misoperation.

The skill type is a classification of skills based on the way of human-computer interaction operation for casting skills. According to different skill casting operations, the skills may be classified into various types as follows: skills that can be automatically cast by clicking/tapping skill controls; skills cast by aiming at a casting direction and releasing in the virtual scene using a wheel virtual joystick invoked by pressing a skill control; and skills cast by aiming at a casting position and releasing in the virtual scene using a wheel virtual joystick invoked by pressing a skill control. The target skill refers to a skill that can be cast by clicking/tapping the virtual scene (the virtual scene picture) to select the casting position. The skill type of the skill is the target skill, that is, the skill is allowed to be cast through the following casting operation: after the skill control is clicked/tapped, the click/tap operation is performed in the virtual scene to select the casting position and cast the skill. Certainly, the same skill may support a plurality of casting operations. For example, as long as the skill is allowed to select a casting position based on a screen click/tap, the skill type of the skill includes the target skill.

In step 203, the terminal controls, in response to a second click/tap operation in the castable region, the controlled virtual object to cast the skill at a casting position indicated by the second click/tap operation.

In the foregoing process, after the terminal detects the second click/tap operation of the user in the castable region, the terminal controls the controlled virtual object to cast the skill at the casting position indicated by the second click/tap operation, and to settle an effect of the skill. Settlement rules of the effects are different according to different skill types.

In an exemplary scenario, for an attack skill of a single-target attack, the terminal may detect whether there are other virtual objects at the casting position. If there are other virtual objects at the casting position, it is determined that the attack skill hits the other virtual objects, and a certain value is deducted from a virtual health point of the other virtual objects; otherwise, if there are no other virtual objects at the casting position, it is determined that the attack skill misses the other virtual objects, which means that the skill cast this time deviates from the target.

In an exemplary scenario, for some area of effect (AOE) skills, the casting position clicked/tapped by the user is actually a center point of a skill attack range, the terminal may detect whether there are other virtual objects within a target distance around the casting position. If there are other virtual objects within the target distance around the casting position, it is determined that the attack skill hits the other virtual objects, and a certain value is deducted from a virtual health point of the other virtual objects; otherwise, if there are no other virtual objects within the target distance around the casting position, it is determined that the attack skill misses the other virtual objects, which means that the skill cast this time deviates from the target.

In the foregoing two exemplary scenarios, the other virtual objects may refer to virtual objects controlled by other users through the terminal, or may refer to virtual props, virtual NPCs, virtual soldiers, virtual buildings, and the like. Types of other virtual objects that can be hit by skills are not specifically limited in the embodiments of this disclosure.

In a method provided by the embodiments of this disclosure, in response to a first click/tap operation on any skill in a virtual scene, a skill type of the skill is obtained; in response to the skill type of the skill being a target skill that supports selecting a casting position based on a screen click/tap, a castable region of the skill is determined in the virtual scene according to a position where a controlled virtual object is located and a casting range of the skill; and in response to a second click/tap operation in the castable region, the controlled virtual object is controlled to cast the skill at a casting position indicated by the second click/tap operation. This human-computer interaction method of first clicking/tapping the skill and then clicking/tapping the casting position to cast the skill can cast the skill based on two click/tap operations without the need for a complex drag operation based on a wheel virtual joystick and a skill joystick, and can avoid an offset error produced when the wheel virtual joystick is mapped into the casting range. Therefore, this method has a higher aiming accuracy and a lower operation difficulty, resulting in more efficient human-computer interaction and improved user experience.

Figure 4:
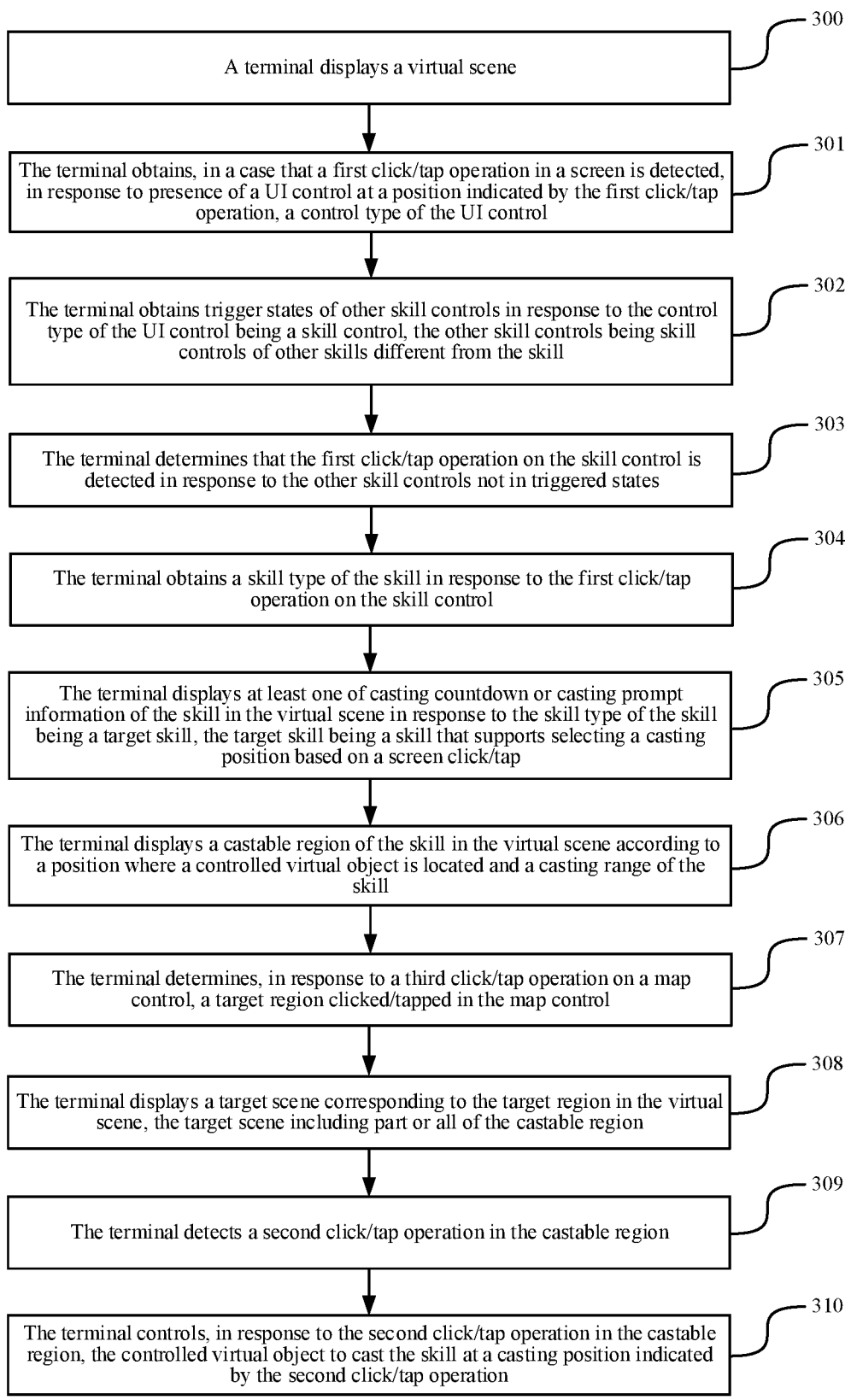
FIG. 4 is a flowchart of a virtual object control method according to an embodiment of this disclosure.

FIG. 4 is a flowchart of a virtual object control method according to an embodiment of this disclosure. Referring to FIG. 4, this embodiment is applied to a terminal, and the terminal may be the first terminal 120 or the second terminal 160 shown in FIG. 1. This embodiment includes the following steps.

In step 300, a terminal displays a virtual scene.

The terminal displays a virtual scene picture and a skill control of the virtual scene, and the virtual scene picture includes a controlled virtual object located in the virtual scene. In the process of displaying the skill control, the terminal may read a target configuration file. The target configuration file stores configuration information of the controlled virtual object. At least one skill possessed by the controlled virtual object and respective meta-information of the at least one skill may be determined based on the configuration information in the target configuration file. The meta-information may include a skill name, a casting mechanism, an action mechanism, a cooling time, a duration, an effect, and the like of each skill. Certainly, the meta-information may also indicate whether each skill has a target skill identifier (such as the IsFullScreenSkill identifier) to detect whether the clicked/tapped skill is the target skill, which is described in the subsequent step 304, and details are not described herein.

In step 301, the terminal obtains, when a first click/tap operation in a screen is detected, in response to presence of a UI control at a position indicated by the first click/tap operation, a control type of the UI control.

The control type of the UI control includes a skill control and a non-skill control. The skill control is a UI control of any skill. The non-skill control is a UI control other than the skill control. The non-skill control includes, but is not limited to, a map control (commonly referred to as a minimap), a store control (a control used to purchase virtual equipment or virtual props), and a mobile joystick (a control used to control the controlled virtual object to move in the virtual scene). The mobile joystick herein is different from a wheel virtual joystick of the skill control in the related art. The mobile joystick is used to control movement of the controlled virtual object, and the wheel virtual joystick of the skill control is used to aim at a casting direction or a casting position of the skill.

In the foregoing process, the user may click/tap a position on the screen. When the first click/tap operation of the user in the virtual scene is detected, the terminal detects whether there is a UI control at a position indicated by the first click/tap operation, and if there is a UI control at the position, the control type of the UI control is obtained. Specifically, the terminal may obtain screen coordinates of the position clicked/tapped by the user, and detect whether the screen coordinates of the position are within a coverage region of all UI controls. When the screen coordinates of the position are within the coverage region of any UI control, it is determined that there is a UI control at the position, and the control type of the UI control is obtained, and when the control type of the UI control is the skill control, the following step 302 is performed. Otherwise, when the screen coordinates of the position are not within the coverage region of all the UI controls (it is determined that there is no UI control at the position), or when the control type of the UI control is the non-skill control, the process is exited.

In the screen (UI), UI controls are usually displayed floating on an upper layer of the virtual scene, so that after the user clicks/taps a position, the terminal needs to detect whether there is a UI control at the position and obtain the control type of the UI control. If the control type of the UI control is a non-skill control, it means that the event triggered by this click/tap operation is not a skill casting event, and the process is exited. Otherwise, if the control type of the UI control is a skill control, the following step 302 needs to be performed for further determining.

In step 302, the terminal obtains triggered states of other skill controls in response to the control type of the UI control being a skill control corresponding to the skill, the other skill controls being skill controls of other skills different from the skill.

The terminal may detect whether there is a skill control at the position through the foregoing step 301. If there is a skill control at the position, the terminal will continue to detect the triggered states of other skill controls. If there are other skill controls that are in a triggered state, it means that the user is already casting other skills, or the user has pressed skill controls of two skills at the same time. Since the user cannot cast two skills at the same time, this click/tap operation is determined as an invalid operation or a misoperation, and the process is exited. Otherwise, if there are no other skill controls in the triggered state, the following step 303 is performed.

In some embodiments, when the skill control of any skill is clicked/tapped, the terminal may assign a blocking identifier CurSkill to the skill. The blocking identifier CurSkill is used to block click/tap events of other skills different from the skill to ensure the uniqueness of the current operated skill. Therefore, when detecting whether there are other skill controls in the triggered state, the terminal only needs to detect whether there is currently any skill with the blocking identifier CurSkill. When there is any skill with the blocking identifier CurSkill, it is determined that there are other skill controls in the triggered state, and the process is exited. Otherwise, when all skills do not have the blocking identifier CurSkill, it is determined that there are no other skill controls in the triggered state, and the following step 303 is performed.

In the foregoing process, when the terminal responds to the presence of a UI control at the position, and the control type of the UI control is a skill control, it means that the user clicks/taps the skill control of the skill. Since the user cannot control two skills at the same time, it is necessary to determine whether other skills have been pressed through the foregoing step 302. Only when no other skills are pressed, the following step 303 is performed, otherwise the process is exited.

In step 303, the terminal determines that the first click/tap operation on the skill in the virtual scene is detected in response to the other skill controls not being in triggered states.

In the foregoing process, it is ensured through step 301 that there is a UI control at the position clicked/tapped by the user, it is ensured through step 302 that the user has clicked/tapped the skill, and the two skills are not currently operated at the same time, so that the first click/tap operation of the user on the skill can be determined, and the following step 304 is performed.

Figure 5:
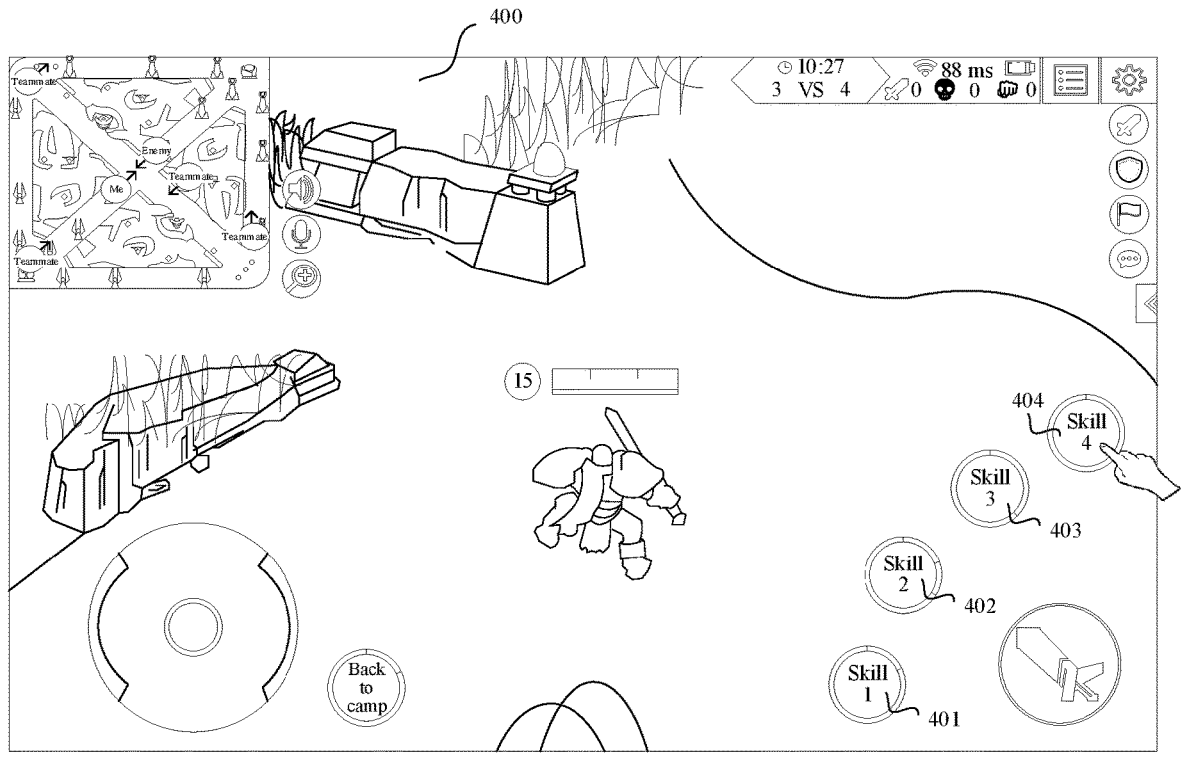
FIG. 5 is a schematic diagram of an interface according to an embodiment of this disclosure.

FIG. 5 is a schematic diagram of an interface according to an embodiment of this disclosure. Referring to FIG. 5, a virtual scene 400 includes skill controls 401 to 404 respectively corresponding to skills 1 to 4. After a user clicks/taps the skill control 404, a terminal detects that the type of a UI control on a touch point is a skill control, and there are no other skill controls in a triggered state, so that it can be determined that a first click/tap operation on the skill 4 is detected.

In step 304, the terminal obtains a skill type of the skill in response to the first click/tap operation on the skill control.

In step 304, the user may click/tap a skill control of any skill in the virtual scene to make the terminal obtain the skill type of the skill in response to the first click/tap operation of the user on the skill. The skill type may include a target skill and skills other than the target skill, and the target skill is a skill that supports selecting a casting position based on a screen click/tap.

The foregoing process may be regarded as a process of detecting whether the skill type of the skill is the target skill. The terminal may add a target skill identifier in a target configuration file for the skill type of the target skill in at least one skill possessed by the controlled virtual object, so that whether the skill type of the skill is the target skill can be determined by detecting whether the skill type of the skill has the target skill identifier in the target configuration file. When it is detected that the skill type of the skill has the target skill identifier, the skill type of the skill is determined as the target skill, and the following step 305 is performed. Otherwise, when it is detected that the skill type of the skill does not have the target skill identifier, it is determined that the skill type of the skill is not the target skill, and the process is exited.

In an exemplary scenario, the target skill identifier may be the IsFullScreenSkill identifier. When the skill is configured to for the controlled virtual object in the target configuration file, an IsFullScreenSkill identifier may be added for the skill type of the target skill as a related parameter of the target skill identifier. When a full-screen touch event (that is, a click/tap operation of the user on any skill) is detected, the terminal may detect whether the skill corresponding to the currently clicked/tapped skill control is marked with the IsFullScreenSkill identifier in the configuration file. When the skill type of the skill has the IsFullScreenSkill identifier, it can be considered that this skill is triggered by the full-screen touch event.

In step 305, the terminal displays at least one of a casting countdown or casting prompt information of the skill in the virtual scene in response to the skill type of the skill being a target skill, the target skill being a skill that supports selecting a casting position based on a screen click/tap.

The terminal obtains the skill type of the skill through the foregoing step 304. When the skill type of the skill is the target skill, the terminal may display the casting countdown or the casting prompt information of the skill in the virtual scene. The casting countdown is used to prompt the user how long the skill remains to be cast, and the casting prompt information is used to prompt the user how to cast the skill.

Further, the duration of the casting countdown or the content of the casting prompt information may be indicated by the target configuration file. The casting countdown or the casting prompt information may be displayed in the virtual scene in the form of text, or may be played floating on the virtual scene picture in the form of animation, or may be intelligently prompted in the form of voice broadcast. Display manners of the casting countdown or the casting prompt information are not specifically limited in the embodiments of this disclosure.

Figure 6:
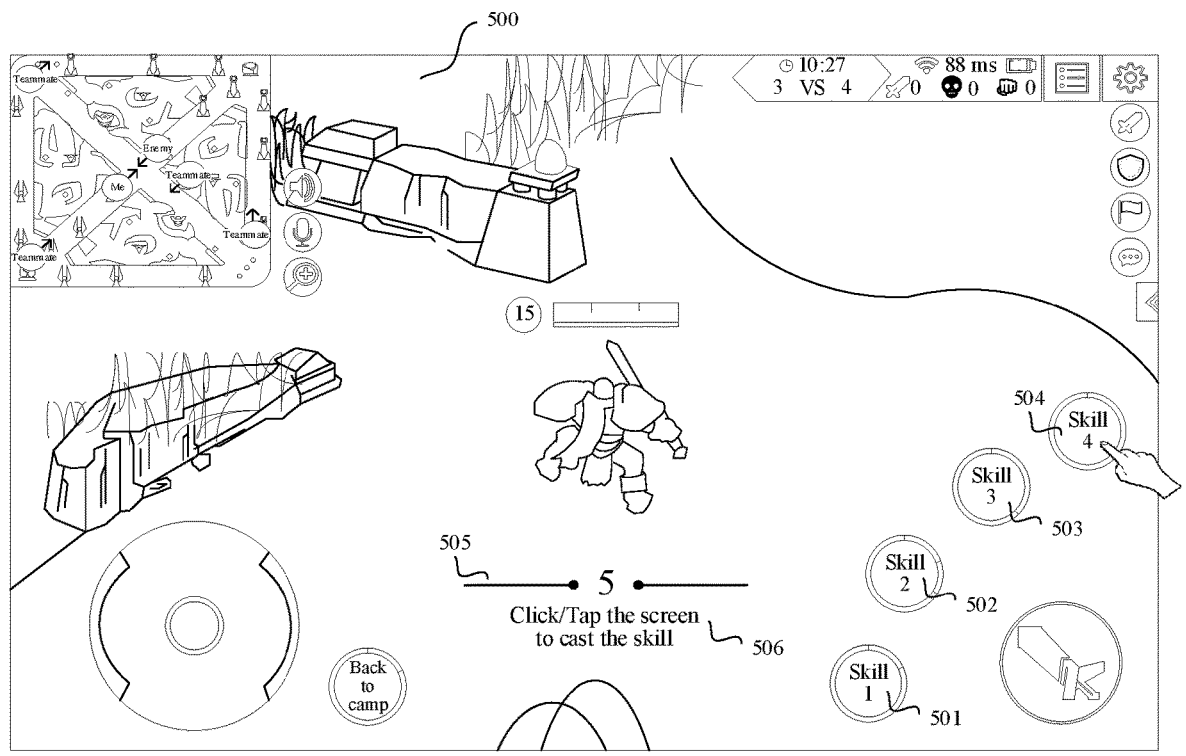
FIG. 6 is a schematic diagram of an interface according to an embodiment of this disclosure.

FIG. 6 is a schematic diagram of an interface according to an embodiment of this disclosure. Referring to FIG. 6, a virtual scene 500 includes skill controls 501 to 504 respectively corresponding to skills 1 to 4. After a user clicks/taps the skill control 504, a terminal detects that the type of a UI control on a touch point is a skill control, and there are no other skill controls in a triggered state, so that it can be determined that a click/tap operation on the skill 4 is detected. After that, the terminal detects that the skill 4 belongs to the target skill, and displays a casting countdown 505 and casting prompt information 506 of the skill 4 in the virtual scene. It can be seen that there are 5 seconds remaining in the current casting countdown, and the casting prompt information 506 is a text message "Click/Tap the screen to cast the skill".

For example, after triggering the skill control for the first time, the user may directly click/tap to select the casting position in the virtual scene, or may use a wheel virtual joystick to select the casting position. The terminal controls, in response to a skill casting operation received on a wheel virtual joystick corresponding to the skill control, the controlled virtual object to cast the skill at a position indicated by the skill casting operation.

In one implementation, the terminal obtains a skill type of a skill in response to a first click/tap operation on a skill control; and displays, in response to the skill type of the skill being a target skill, a castable region of the skill in a virtual scene and casting countdown of the skill according to a position where a controlled virtual object is located and a casting range of the skill. During the casting countdown, the user may control the controlled virtual object to cast the skill by clicking/tapping any casting position on the castable region in the virtual scene, or may press the skill control again to invoke a wheel virtual joystick of the skill control and drag a joystick part to select the casting position, and release to control the virtual object to cast the skill at the position mapped by the joystick part in the virtual scene.

In step 306, the terminal displays a castable region of the skill in the virtual scene according to a position where a controlled virtual object is located and a casting range of the skill.

In some embodiments, if the castable region is a round region, in the virtual scene, the terminal may determine the position where the controlled virtual object is located as a center of the castable region, and determine a farthest casting distance of the skill as a radius of the castable region. Certainly, if the castable region is not limited to a round region, and may be a fan-shaped region, a rectangular region, an irregular region, or the like. For example, when the castable region is a fan-shaped region, the user may control the orientation of the fan-shaped region through a movement operation, and rotate the orientation of the fan-shaped region through a rotation operation. For example, if the user clicks/taps a first position in the castable region and then moves to a second position, the orientation of the fan-shaped region is from the first position to the second position. If the user continues to move from the second position to a third position, the fan-shaped region is rotated to the direction from the first position to the third position.

In some embodiments, the terminal adds a casting template for the castable region in the virtual scene, and the casting template is used for indicating that casting of the skill in a region outside the casting template is invalid. After that, if a first click/tap operation of the user on the screen is detected again, the terminal may determine whether a position point is in the castable region by detecting whether a position point indicated by the first click/tap operation is in the casting template. Specifically, when the position point is in the casting template, it is determined that the position point is in the castable region, and the following step 307 is performed; otherwise, when the position point is not in the casting template, it is determined that the position point is outside the castable region, the skill is not cast, and the click/tap operation is regarded as an invalid operation or a misoperation.

In step 307, the terminal determines, in response to a third click/tap operation on a map control, a target region clicked/tapped in the map control.

In the foregoing process, because the virtual scene is usually large and the size of the terminal screen is limited, and only a part of the virtual scene can be displayed on the terminal screen, the map control may usually be displayed in the virtual scene, and the map control is used to switch the part of the virtual scene currently displayed on the screen to another part of the virtual scene at any time. In this case, it is not necessary for the user to control the virtual object to move to switch viewing angles, but the viewing angles may be switched by directly clicking/tapping the target region in the map control, greatly facilitating user operations.

In some embodiments, each map point in the map control corresponds to a position point in the virtual scene, so that the entire virtual scene is scaled down according to a certain ratio and displayed in the map control. When the third click/tap operation of the user on the map control is detected, the terminal may determine the map point clicked/tapped by the user in the map control and determine a rectangular region using the map point as a center. The length-to-width ratio of the rectangular region is equal to the length-to-width ratio of the terminal screen, and the size of the rectangular region may be preset by the user, so that the rectangular region is determined as the clicked/tapped target region.

In step 308, the terminal displays a target scene corresponding to the target region in the virtual scene, the target scene including the castable region.

In the foregoing process, the terminal maps the target region into the target scene according to a mapping relationship between the map control and the virtual scene, and displays the target scene on the terminal screen. Since the target scene includes part or all of the castable region, the user may cast the skill through a click/tap operation again.

Figure 7:
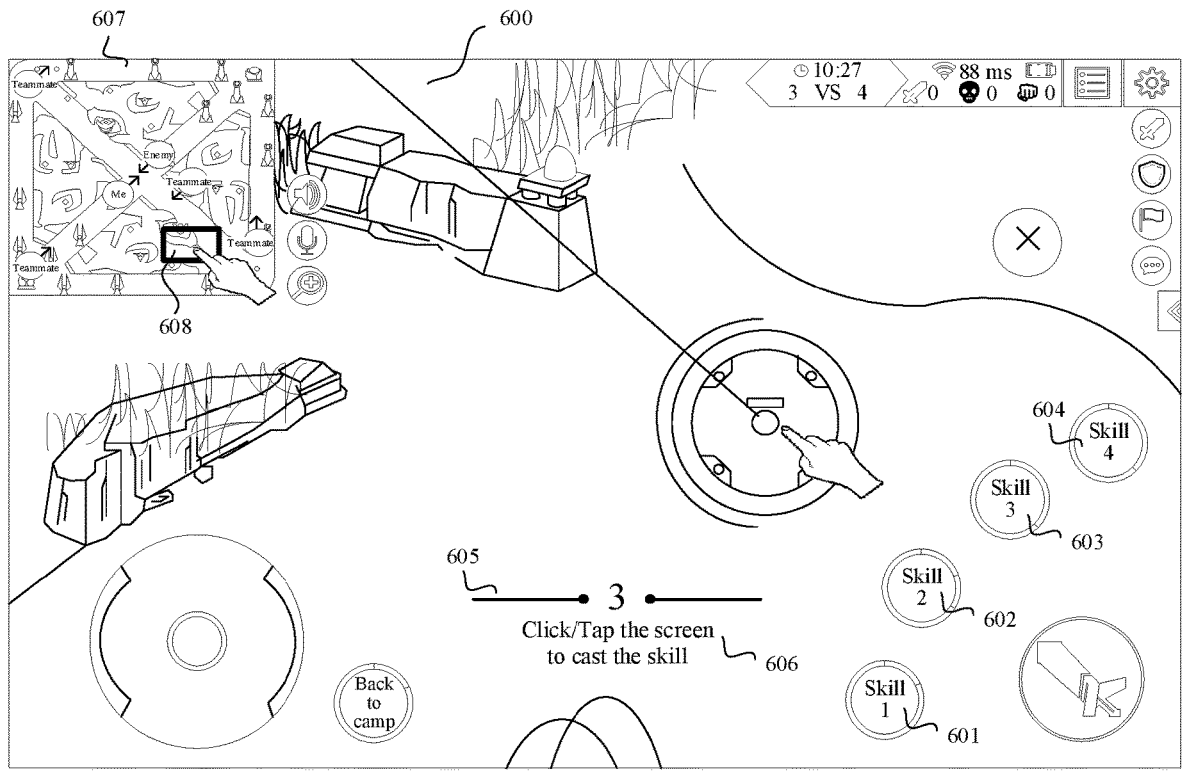
FIG. 7 is a schematic diagram of an interface according to an embodiment of this disclosure.

FIG. 7 is a schematic diagram of an interface according to an embodiment of this disclosure. Referring to FIG. 7, a virtual scene includes skill controls 601 to 604 respectively corresponding to skills 1 to 4. After a user clicks/taps the skill control 604, a terminal detects that the type of a UI control on a touch point is a skill control, and there are no other skill controls in a triggered state, so that it can be determined that a click/tap operation on the skill 4 is detected. After that, the terminal detects that the skill 4 belongs to the target skill, and displays casting countdown 605 and casting prompt information 606 of the skill 4 in the virtual scene. It can be seen that there are 3 seconds remaining in the current casting countdown, and the casting prompt information 606 is a text message "Click/Tap the screen to cast the skill". Further, a map control 607 is also displayed in the virtual scene. After the user clicks/taps the map control 607, the terminal determines a target region 608 clicked/tapped in the map control 607, and displays a target scene 600 mapped by the target region 608 on the terminal screen.

For example, the virtual scene picture displayed on the terminal is a picture captured by observing the virtual scene with a camera in the virtual scene. According to the third click/tap operation received on the map control, the terminal may determine a position of the camera, so as to display the target scene on the virtual scene picture according to a new position of the camera.

In one implementation, the terminal may also receive other operations for changing the position of the camera, thereby changing the target scene displayed on the virtual scene picture on the terminal. For example, the terminal may also receive a viewing angle movement operation on a viewing angle movement region, and the viewing angle movement operation is a sliding operation. The terminal determines a direction and distance of movement of the camera according to a direction and distance of the sliding operation, and then calculates a position of the camera after the movement according to the current position of the camera, so that the moved camera captures the virtual scene picture of the target scene. In another example, the terminal may also receive a movement operation of controlling the controlled virtual object to move. Since the camera is set by default to follow the controlled virtual object for shooting, when the position of the controlled virtual object in the virtual scene changes, the camera moves correspondingly, and the target scene displayed on the virtual scene picture also changes correspondingly.

The user may use any one of the foregoing methods to make the terminal display the virtual scene picture of the target scene, and then select the casting position in the virtual scene picture of the target scene.

In step 309, the terminal detects a second click/tap operation in the castable region.

In the foregoing process, the terminal detects the second click/tap operation of the user in the castable region in the target scene. Because the terminal may add a casting template for the castable region in the foregoing step 306, and the casting template is used for indicating that casting of the skill in a region outside the casting template is invalid. After that, if a second click/tap operation of the user on the target scene is detected again, the terminal may determine whether a casting position is in the castable region by detecting whether a casting position indicated by the second click/tap operation is in the casting template. Specifically, when the casting position is in the casting template, it is determined that the casting position is in the castable region, and the following step 310 is performed; otherwise, when the casting position is not in the casting template, it is determined that the casting position is outside the castable region, the skill is not cast, and the click/tap operation is regarded as an invalid operation or a misoperation.

In step 310, the terminal controls, in response to the second click/tap operation in the castable region, the controlled virtual object to cast the skill at a casting position indicated by the second click/tap operation.

In the foregoing process, after the terminal detects the second click/tap operation of the user in the castable region, the terminal may obtain screen coordinates of the casting position indicated by the second click/tap operation in the terminal screen in response to the second click/tap operation of the user in the castable region, and map the screen coordinates into scene coordinates of the casting position in the virtual scene, so as to control the controlled virtual object to cast the skill at the scene coordinates.

In some embodiments, when the terminal maps the screen coordinates into the scene coordinates, an inverse matrix of the following formula may be used to convert the screen coordinates in a two-dimensional screen to the scene coordinates in a three-dimensional scene FocusPoint:

$$Z_c \begin{bmatrix} u \\ v \\ 1 \end{bmatrix} = \begin{bmatrix} \frac{1}{dx} & 0 & u_0 \\ 0 & \frac{1}{dy} & v_0 \\ 0 & 0 & 1 \end{bmatrix} \begin{bmatrix} f & 0 & 0 & 0 \\ 0 & f & 0 & 0 \\ 0 & 0 & 1 & 0 \end{bmatrix} \begin{bmatrix} R & T \\ \vec{0} & 1 \end{bmatrix} \begin{bmatrix} X_w \\ Y_w \\ Z_w \\ 1 \end{bmatrix} =$$

$$\begin{bmatrix} f_x & 0 & u_0 & 0 \\ 0 & f_y & v_0 & 0 \\ 0 & 0 & 1 & 0 \end{bmatrix} \begin{bmatrix} R & T \\ \vec{0} & 1 \end{bmatrix} \begin{bmatrix} X_w \\ Y_w \\ Z_w \\ 1 \end{bmatrix}$$

$$\begin{bmatrix} f_x & 0 & u_0 & 0 \\ 0 & f_y & v_0 & 0 \\ 0 & 0 & 1 & 0 \end{bmatrix}$$

is an intrinsic matrix of a camera, $f_x$ represents a focal length of the camera in an x-axis direction, $f_y$ represents a focal length of the camera in a y-axis direction, and $u_0$ and $v_0$ are aperture centers of the camera.

$$\begin{bmatrix} R & T \\ \vec{0} & 1 \end{bmatrix}$$

is an extrinsic matrix of the camera, R represents a rotation matrix, and T represents an offset vector.

$X_w$, $Y_w$, and $Z_w$ represent scene coordinates of the casting position on the x-axis, y-axis, and z-axis in the three-dimensional scene respectively, u and v represent screen coordinates of the casting position on the u-axis and v-axis in the two-dimensional screen respectively, $Z_c$ represents a coordinate value of the casting position on the z axis in a camera coordinate system, and f is a focal length of the camera.

Further, after the scene coordinates of the casting position of the skill are determined, a skill indicator may be called to display an expected casting position of the skill in the virtual scene. The user may observe whether the expected casting position is the desired casting position through skill indication. If the two are consistent, the user may trigger the controlled virtual object to cast the skill at the clicked/tapped casting position after releasing.

In some embodiments, if the two are inconsistent (that is, the expected casting position displayed by the skill indicator is not desired), the user may not release, but perform a drag operation on the screen, so that the terminal updates, in response to the drag operation of the user in the castable region, a casting position indicated by the drag operation in the virtual scene based on a drag trajectory of the drag operation. Finally, after the user finishes dragging and releasing, the controlled virtual object is triggered to cast the skill at a newly updated casting position in the drag trajectory.

After the skill is cast, the terminal may further settle an effect of the skill. Settlement rules of the effects are different according to different skill types.

In one implementation, after receiving the second click/tap operation on the castable region, the terminal displays a skill circle at the casting position indicated by the second click/tap operation. For example, the terminal displays a first skill circle at the casting position, the first skill circle identifying an influence range of a skill effect produced by casting the skill; and controls the controlled virtual object to cast the skill in the first skill circle.

For example, the shape and size of the skill circle are determined according to the influence range of the skill. For example, the shape of the skill circle may be round or oval, the center point of the skill circle is at the position point selected by the second click/tap operation of the selected casting position, and the radius of the skill circle is the farthest distance of the skill for producing the effect.

For example, the skill circle is used to determine an actual influence range of the skill. When the skill is an AOE skill, casting the skill produces a skill effect on all targets in the skill circle. When the skill is a single-target attack skill, after the skill is cast, the terminal determines whether there is an attackable target in the skill circle. If there is one attackable target, the skill effect is produced on the target; if there are a plurality of attackable targets, one target is selected from the plurality of targets to produce the skill effect thereon; and if there is no attackable target, there is no action target for this skill casting, and no skill effect is produced on any unit.

In one implementation, the skill is used to produce a skill effect on a single target, and the first skill circle includes at least two targets. The terminal determines a first target from the at least two targets in the first skill circle according to a target determining principle; and controls the controlled virtual object to cast the skill to produce the skill effect on the first target. The target determining principle includes a principle of nearest distance first, a principle of lowest health point first, and a principle of lowest health bar first.

The principle of nearest distance first is to determine a target closest to a center point of a skill circle in the skill circle as an attack target. The principle of lowest health point first is to determine a target with the least health point in a skill circle as an attack target. The principle of lowest health bar first is to determine a target with the smallest ratio of current health point to total health point in a skill circle as an attack target.

Certainly, a final attack target may alternatively be determined from a plurality of targets according to other target determining principles. For example, a target of a first type may be determined as an attack target first according to the type of the target. For example, the type of the target may include other virtual objects controlled by other users, monsters, soldiers, and buildings controlled by programs, and the like. The first type may be other virtual objects controlled by other users.

In another example, a target at an attack state may alternatively be attacked first according to the state of the target. As some virtual objects have a defensive skill, virtual objects in a defensive state have a high defense value. In this case, the terminal may first select to attack a target at the attack state, so as to avoid a target with the high defense value.

Figure 8:
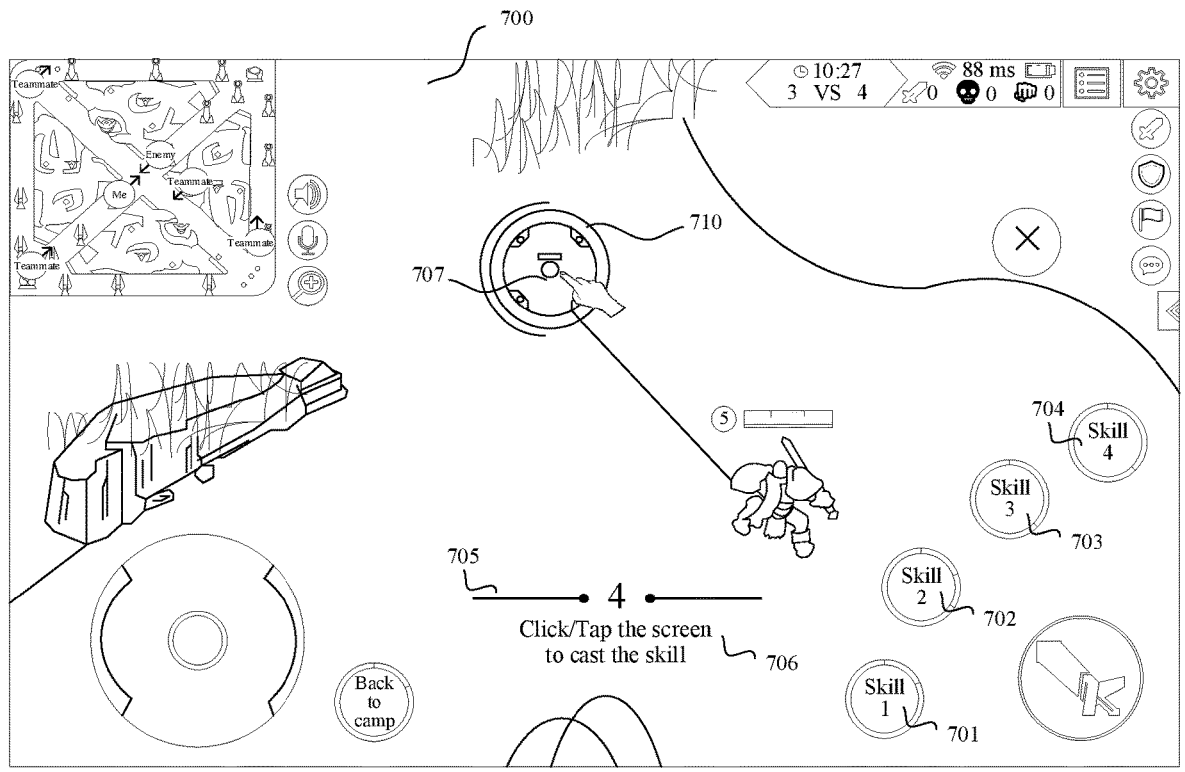
FIG. 8 is a schematic diagram of an interface according to an embodiment of this disclosure.

FIG. 8 is a schematic diagram of an interface according to an embodiment of this disclosure. Referring to FIG. 8, a virtual scene 700 includes skill controls 701 to 704 respectively corresponding to skills 1 to 4. After a user clicks/taps the skill control 704, a terminal detects that the type of a UI control on a touch point is a skill control, and there are no other skill controls in a triggered state, so that it can be determined that a click/tap operation on the skill 4 is detected. After that, the terminal detects that the skill 4 belongs to the target skill, and displays a casting countdown 705 and casting prompt information 706 of the skill 4 in the virtual scene. It can be seen that there are 4 seconds remaining in the current casting countdown, and the casting prompt information 706 is a text message "Click/Tap the screen to cast the skill". In response to the user clicking/tapping a casting position 707 in a castable region in the virtual scene, the terminal displays a first skill circle 710 at the casting position 707, and controls a controlled virtual object to directly cast the skill 4 in the first skill circle 710.

Any combination of the foregoing technical solutions may be used to form an embodiment of this disclosure. Details are not described herein again.

In the method provided by the embodiments of this disclosure, in response to a first click/tap operation on any skill in a virtual scene, a skill type of the skill is obtained; in response to the skill type of the skill being a target skill that supports selecting a casting position based on a screen click/tap, a castable region of the skill is determined in the virtual scene according to a position where a controlled virtual object is located and a casting range of the skill; and in response to a second click/tap operation in the castable region, the controlled virtual object is controlled to cast the skill at a casting position indicated by the second click/tap operation. This human-computer interaction method of first clicking/tapping the skill and then clicking/tapping the casting position to cast the skill can cast the skill based on two click/tap operations without the need for a complex drag operation based on a wheel virtual joystick and a skill joystick, and can avoid an offset error produced when the wheel virtual joystick is mapped into the casting range. Therefore, this method has a higher aiming accuracy and a lower operation difficulty, resulting in more efficient human-computer interaction and improved user experience.

For example, the user may further frame the casting region in the castable region, so as to more accurately select the influence range of the skill and improve the accuracy of aiming.

Figure 9:
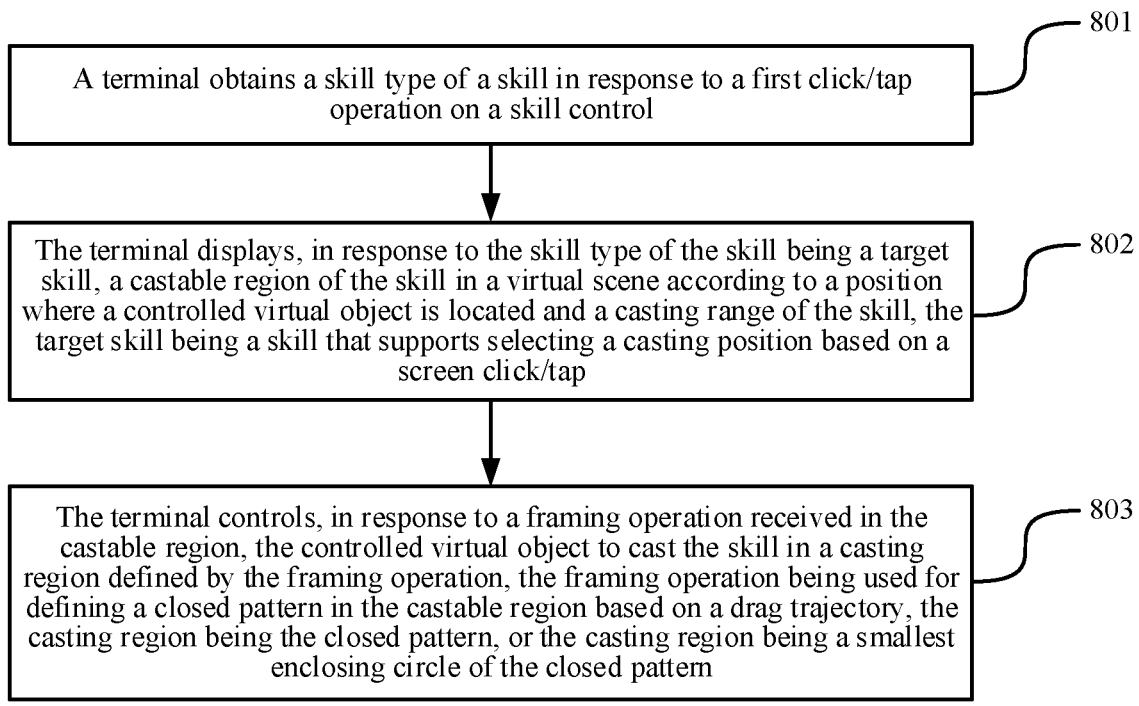
FIG. 9 is a flowchart of a virtual object control method according to an embodiment of this disclosure.

FIG. 9 is a flowchart of a virtual object control method according to an embodiment of this disclosure. Referring to FIG. 9, this embodiment is applied to a terminal, and the terminal may be the first terminal 120 or the second terminal 160 shown in FIG. 1. This embodiment includes the following steps.

In step 801, a terminal obtains a skill type of a skill in response to a first click/tap operation of the skill in a virtual scene.

In step 802, the terminal determines, in response to the skill type of the skill being a target skill, a castable region of the skill in the virtual scene according to a position where a controlled virtual object is located and a casting range of the skill, the target skill being a skill that supports selecting a casting position based on a screen click/tap.

In step 803, the terminal controls, in response to a framing operation received in the castable region, the controlled virtual object to cast the skill in a casting region defined by the framing operation, the framing operation being used for defining a closed pattern in the castable region based on a drag trajectory, the casting region being the closed pattern, or the casting region being a smallest enclosing circle of the closed pattern.

The framing operation can be understood as an operation of the user to draw the closed pattern on the castable region (an operation of drawing a circle). Certainly, a pattern drawn through the framing operation of the user may not be a standard closed pattern. For example, the drawn pattern may be semi-closed or have cross lines. In this case, the terminal may automatically optimize the pattern drawn by the user into a closed pattern, thereby obtaining the closed pattern corresponding to the framing operation.

The terminal may use the closed pattern as the casting region of the skill. The terminal may alternatively use the smallest enclosing circle of the closed pattern as the casting region of the skill, that is, the user frames an approximate size of the skill casting region through the framing operation, and then the terminal determines the smallest enclosing circle of the closed pattern as the final casting region.

For example, to prevent the casting region framed by the user from being excessively large, the terminal also needs to ensure that the casting region is smaller than an area threshold before the framed casting region can be determined as a valid casting region.

The terminal calculates a region area of the casting region defined by the framing operation in response to the framing operation received in the castable region; and controls the controlled virtual object to cast the skill in the casting region defined by the framing operation in response to the region area being less than an area threshold.

In response to the region area being greater than the area threshold, the terminal determines that the casting region selected this time is an invalid region, and displays prompt information indicating that the operation is invalid to prompt the user to continue to select a casting region, or to end the skill casting process this time.

For example, referring to the description of the skill circle in the previous embodiment, in this embodiment, the corresponding skill circle may also be displayed on the casting region to display an actual influence range of the skill.

The terminal displays a second skill circle in the casting region in response to the region area being less than the area threshold, the second skill circle being used for identifying an influence range of a skill effect produced by casting the skill, and a shape of the second skill circle being the same as the casting region; and controls the controlled virtual object to cast the skill in the second skill circle.

For example, referring to the description of how to determine the final attack target when there are a plurality of targets in the skill circle in the previous embodiment, in this embodiment, the final attack target may also be determined according to this method.

That is, the skill is used for producing a skill effect on a single target, and the second skill circle includes at least two targets. The terminal determines a second target from the at least two targets in the second skill circle according to a target determining principle; and controls the controlled virtual object to cast the skill to produce the skill effect on the second target. The target determining principle includes a principle of nearest distance first, a principle of lowest health point first, and a principle of lowest health bar first.

In conclusion, according to the method in this embodiment, the casting region is framed in the castable region, so that the user may control the region size of skill casting, which further improves the accuracy of aiming at the skill casting region by the user, and reduces the operation difficulty of accurately casting the skill, resulting in more efficient human-computer interaction and improved user experience.

Figure 10:
FIG. 10 is a schematic principle diagram of touch screen skill casting according to an embodiment of this disclosure.

FIG. 10 is a schematic principle diagram of touch screen skill casting according to an embodiment of this disclosure. Referring to FIG. 10, in an exemplary scenario shown as 800, a terminal may cast a touch screen skill (that is, a target skill) through the following process. When a finger of a player touches a screen and the screen is in a pressed state, the terminal first determines whether a current touch point is on another UI control, that is, detects whether there is another virtual button at the touch point, for example, a virtual button of a non-skill control such as a minimap (a map control), a store (a store control), or a mobile joystick, and a touch event not on such non-skill control is considered as the touch event required for skill casting this time. Then, whether a skill button on the current touch point is pressed is detected, that is, whether the current touch point is on a skill control of any skill is detected. If the current touch point is on the skill control of any skill, and because the player cannot operate two skills at the same time, it is necessary to determine whether another skill control has been pressed, that is, to check whether there is another touch screen casting skill that has been triggered. This touch skill operation can only be received when no other skill controls are pressed.

In addition, when the skill is configured, related parameters are configured for the touch screen skill, for example, the IsFullScreenSkill identifier is added to the skill. When a full-screen touch event is detected, the terminal detects whether the skill corresponding to the current skill control has the IsFullScreenSkill identifier. When the skill has the IsFullScreenSkill identifier, it is considered that the skill is triggered by the full-screen touch event. In this case, a touch identifier FingerID and a blocking identifier CurSkill of the current full-screen touch event may be set. The touch identifier FingerID is used to distinguish the current full-screen touch event from other pressed touch events. The blocking identifier CurSkill is used to block pressed events of other controls to ensure the uniqueness of the current operated skill. When all the foregoing steps pass successfully, the terminal calculates scene coordinates FocusPoint in the virtual scene according to the touch point (screen coordinates of the casting position) on the skill control, and processes the performance of a skill indicator according to the scene coordinates FocusPoint, to show the player a preview effect of an expected casting position.

Further, when the touch point moves on the screen, the screen is in a drag state. First, whether the touch identifier FingerID of the currently pressed event is consistent with the FingerID of the previously triggered full-screen touch event is detected, that is, whether the touch point is the same as the previous touch identifier FingerID and whether there is a blocking identifier CurSkill are detected. When the touch identifier FingerID is the same and there is a blocking identifier CurSkill, whether there is a skill triggered by the currently pressed event is then determined. When these two conditions are met, the terminal updates the scene coordinates FocusPoint with the current touch point, that is, maps according to screen coordinates of a new touch point to obtain new scene coordinates FocusPoint.

Further, when the touch point is lifted (the player releases), the screen is in a release state. The terminal also detects whether the FingerID of the currently pressed event is consistent with the FingerID of the previously triggered full-screen touch event, that is, detects whether the touch point is the same as the previous touch identifier FingerID and whether there is a blocking identifier CurSkill. When the touch identifier FingerID is the same and there is a blocking identifier CurSkill, if there is a skill triggered by the currently pressed event, and when these two conditions are met, the terminal sends out relevant skill data (including the blocking identifier CurSkill, the final scene coordinates FocusPoint, and the like), requests a server to cast the skill, and synchronizes with other terminals participating in the game based on a frame synchronization technology.

Specifically, for touch screen skills that allow tapping the screen to cast spells, the player taps the skill control to enter a screen spell casting mode, and a closing countdown of the screen spell casting mode (that is, casting countdown of the skill) and casting prompt information "Tap the screen to cast the skill" are displayed in the middle and lower region of the screen. In addition, a layer of casting template is added in the casting range of the skill. The casting template indicates that the region covered by the template can be tapped for spell casting. If the player taps a position outside the region, the spell is not cast. During the countdown, when the player taps the screen, the skill is cast directly at the tapped casting position in the castable region of the virtual scene. If the skill needs to be cast to a position outside the screen, the player may first tap the minimap to move the screen to a corresponding position, and then tap the screen to cast the skill.

In this embodiment of this disclosure, a mechanism of tapping the screen to cast (that is, release) spells is added for skills with a large casting range. The player may directly cast spells at the tapped casting position by tapping the screen to achieve an interaction effect of "what you see is what you get", which improves the aiming accuracy during spell casting, makes the playing process of the player more comfortable, and optimizes the user experience. Certainly, for touch screen skills that allow tapping the screen to cast spells, the terminal may also provide two compatible spell casting methods, so that the user can cast spells either by tapping the screen or based on a related wheel virtual joystick, providing a rich and diversified method of human-computer interaction.

Figure 11:
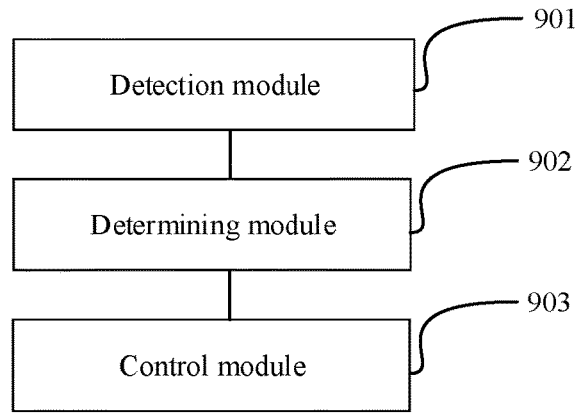
FIG. 11 is a schematic structural diagram of a virtual object control apparatus according to an embodiment of this disclosure.

FIG. 11 is a schematic structural diagram of a virtual object control apparatus according to an embodiment of this disclosure. Referring to FIG. 11, the apparatus includes a detection module 901, a determining module 902, and a control module 903. One or more of the modules of the apparatus can be implemented by processing circuitry, software or a combination thereof, for example.

The detection module 901 is configured to detect whether a skill is a target skill in response to a first click/tap operation on a skill control, the target skill being a skill that supports selecting a casting position based on a screen click/tap.

The determining module 902 is configured to display, in response to the skill being the target skill, a castable region of the skill in a virtual scene according to a position where a controlled virtual object is located and a casting range of the skill.

The control module 903 is configured to control, in response to a second click/tap operation in the castable region, the controlled virtual object to cast the skill at a casting position indicated by the second click/tap operation.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In the apparatus provided by the embodiments of this disclosure, in response to a first click/tap operation on any skill in a virtual scene, a skill type of the skill is obtained; in response to the skill type of the skill being a target skill that supports selecting a casting position based on a screen click/tap, a castable region of the skill is determined in the virtual scene according to a position where a controlled virtual object is located and a casting range of the skill; and in response to a second click/tap operation in the castable region, the controlled virtual object is controlled to cast the skill at a casting position indicated by the second click/tap operation. This human-computer interaction method of first clicking/tapping the skill and then clicking/tapping the casting position to cast the skill can cast the skill based on two click/tap operations without the need for a complex drag operation based on a wheel virtual joystick and a skill joystick, and can avoid an offset error produced when the wheel virtual joystick is mapped into the casting range. Therefore, this method has a higher aiming accuracy and a lower operation difficulty, resulting in more efficient human-computer interaction and improved user experience.

In one implementation, the control module 903 is configured to: obtain screen coordinates of the casting position indicated by the second click/tap operation in a screen in response to the second click/tap operation in the castable region; map the screen coordinates into scene coordinates of the casting position in the virtual scene; and control the controlled virtual object to cast the skill at the scene coordinates.

In one implementation, based on the apparatus composition of FIG. 11, the apparatus further includes a mapping detection module, configured to: determine, in response to a third click/tap operation on a map control, a target region clicked/tapped in the map control; display a target scene corresponding to the target region in the virtual scene, the target scene including the castable region; and detect the second click/tap operation in the castable region in the target scene.

In one implementation, when the castable region is a round region, the determining module 902 is configured to in the virtual scene, determine the position where the controlled virtual object is located as a center of the castable region, and determine a farthest casting distance of the skill as a radius of the castable region; and display a casting template of the castable region in the virtual scene, the casting template being used for indicating that casting of the skill in a region outside the casting template is invalid.

In one implementation, based on the apparatus composition of FIG. 11, the apparatus further include a display module, configured to display at least one of casting countdown or casting prompt information of the skill in the virtual scene in response to the skill being the target skill.

In one implementation, the control module 903 is configured to control, in response to a skill casting operation received on a wheel virtual joystick corresponding to the skill control, the controlled virtual object to cast the skill at a position indicated by the skill casting operation.

In one implementation, the detection module 901 is further configured to in a case that the first click/tap operation in the screen is detected, obtain, in response to presence of a UI control at a position indicated by the first click/tap operation, a control type of the UI control; obtain triggered states of other skill controls in response to the control type of the UI control being the skill control corresponding to the skill, the other skill controls being skill controls of other skills different from the skill; and determine that the first click/tap operation on the skill control is detected in response to the other skill controls not in triggered states.

In one implementation, based on the apparatus composition of FIG. 11, the apparatus further includes an update module, configured to update, in response to a drag operation in the castable region, a casting position indicated by the drag operation in the virtual scene based on a drag trajectory of the drag operation.

In one implementation, the apparatus further includes: a display module, configured to display a first skill circle at the casting position, the first skill circle being used for identifying an influence range of a skill effect produced by casting the skill; and the control module being configured to control the controlled virtual object to cast the skill in the first skill circle.

In one implementation, the skill is used to produce a skill effect on a single target, and the first skill circle includes at least two targets; the control module is configured to determine a first target from the at least two targets in the first skill circle according to a target determining principle; the control module is configured to control the controlled virtual object to cast the skill to produce the skill effect on the first target; and the target determining principle including a principle of nearest distance first, a principle of lowest health point first, and a principle of lowest health bar first.

In one implementation, the control module is configured to control, in response to a framing operation received in the castable region, the controlled virtual object to cast the skill in a casting region defined by the framing operation, the framing operation being used for defining a closed pattern in the castable region based on a drag trajectory, the casting region being the closed pattern, or the casting region being a smallest enclosing circle of the closed pattern.

In one implementation, the control module is configured to calculate a region area of the casting region defined by the framing operation in response to the framing operation received in the castable region; and the control module is configured to control the controlled virtual object to cast the skill in the casting region defined by the framing operation in response to the region area being less than an area threshold.

In one implementation, the apparatus further includes: a display module, configured to display a second skill circle in the casting region in response to the region area being less than the area threshold, the second skill circle being used for identifying an influence range of a skill effect produced by casting the skill, and a shape of the second skill circle being the same as the casting region; and the control module being configured to control the controlled virtual object to cast the skill in the second skill circle.

In one implementation, the skill is used to produce a skill effect on a single target, and the second skill circle includes at least two targets; the control module is configured to determine a second target from the at least two targets in the second skill circle according to a target determining principle; the control module is configured to control the controlled virtual object to cast the skill to produce the skill effect on the second target; and the target determining principle including a principle of nearest distance first, a principle of lowest health point first, and a principle of lowest health bar first.

When the virtual object control apparatus provided in the foregoing embodiments controls the virtual object, only division of the foregoing functional modules is used as an example for description. In the practical application, the functions may be allocated to and completed by different functional modules according to requirements. That is, an internal structure of a terminal device is divided into different functional modules, to complete all or some of the functions described above. In addition, the virtual object control apparatus and the virtual object control method provided in the foregoing embodiments belong to the same concept. For a specific implementation process, refer to the embodiments of the virtual object control method, and details are not described herein again.

Figure 12:
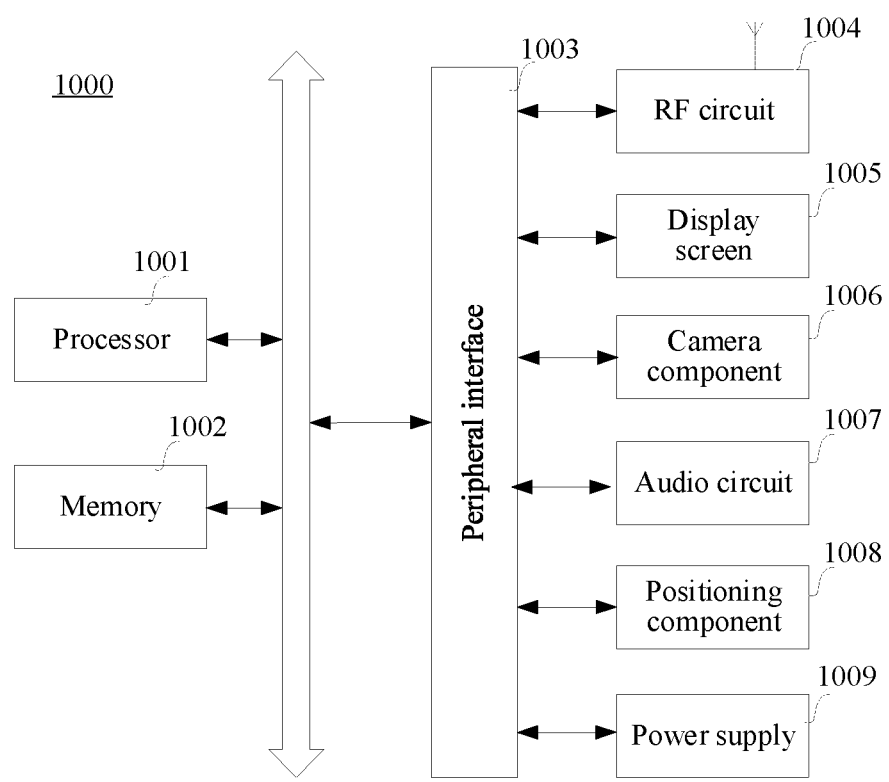
FIG. 12 is a schematic structural diagram of a terminal according to an embodiment of this disclosure.

FIG. 12 is a schematic structural diagram of a terminal according to an embodiment of this disclosure. The terminal 1000 may be a smartphone, a tablet computer, an MP3 player, an MP4 player, a notebook computer, or a desktop computer. The terminal 1000 may also be referred to as a user equipment, a portable terminal, a laptop terminal, a desktop terminal, or the like.

Generally, the terminal 1000 includes a processor 1001 and a memory 1002.

The processor 1001 may include one or more processing cores, for example, a 4-core processor or an 8-core processor. The processor 1001 may be implemented by using at least one hardware form of a digital signal processor (DSP), a field-programmable gate array (FPGA), and a programmable logic array (PLA). The processor 1001 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 1001 may be integrated with a graphics processing unit (GPU). The GPU is configured to be responsible for rendering and drawing content that a display needs to display. In some embodiments, the processor 1001 may further include an AI processor. The AI processor is configured to process a computing operation related to machine learning.

The memory 1002 may include one or more computer-readable storage media. The computer-readable storage medium may be non-transient. The memory 1002 may further include a high-speed random access memory and a nonvolatile memory, for example, one or more disk storage devices or flash storage devices. In some embodiments, the non-transient computer-readable storage medium in the memory 1002 is configured to store at least one instruction. The at least one instruction is executed by the processor 1001 to perform the virtual object control method provided in the embodiments of this disclosure.

In some embodiments, the terminal 1000 may include: a peripheral interface 1003 and at least one peripheral. The processor 1001, the memory 1002, and the peripheral interface 1003 may be connected by using a bus or a signal cable. Each peripheral may be connected to the peripheral interface 1003 by using a bus, a signal cable, or a circuit board. Specifically, the peripheral includes: at least one of a radio frequency (RF) circuit 1004, a touch display screen 1005, a camera assembly 1006, an audio circuit 1007, a positioning component 1008, and a power supply 1009.

The peripheral interface 1003 may be configured to connect the at least one peripheral related to input/output (I/O) to the processor 1001 and the memory 1002. In some embodiments, the processor 1001, the memory 1002, and the peripheral interface 1003 are integrated on the same chip or circuit board. In some other embodiments, any one or two of the processor 1001, the memory 1002, and the peripheral interface 1003 may be implemented on an independent chip or circuit board. This is not limited in this embodiment.

The RF circuit 1004 is configured to transmit and receive an RF signal, which is also referred to as an electromagnetic signal. The RF circuit 1004 communicates with a communication network and other communication devices through the electromagnetic signal. The RF circuit 1004 converts an electrical signal into an electromagnetic signal for transmission, or converts a received electromagnetic signal into an electrical signal. Further, the RF circuit 1004 includes an antenna system, an RF transceiver, one or more amplifiers, a tuner, an oscillator, a digital signal processor, a codec chip set, a subscriber identity module card, and the like. The RF circuit 1004 may communicate with another terminal by using at least one wireless communication protocol. The wireless communication protocol includes, but is not limited to: a metropolitan area network, generations of mobile communication networks (2G, 3G, 4G, and 5G), a wireless local area network and/or a wireless fidelity (Wi-Fi) network. In some embodiments, the RF 1004 may further include a circuit related to near field communication (NFC), which is not limited in this disclosure.

The touch display screen 1005 is configured to display a UI. The UI may include a graph, text, an icon, a video, and any combination thereof. When the touch display screen 1005 is a touch display screen, the touch display screen 1005 is further capable of acquiring touch signals on or above a surface of the touch display screen 1005. The touch signal may be used as a control signal to be inputted to the processor 1001 for processing. In this case, the touch display screen 1005 may be further configured to provide a virtual button and/or a virtual keyboard, which is also referred to as a soft button and/or a soft keyboard. In some embodiments, there may be one touch display screen 1005, disposed on a front panel of the terminal 1000. In some other embodiments, there may be at least two touch display screens 1005, disposed on different surfaces of the terminal 1000 respectively or in a folded design. In some more embodiments, the touch display screen 1005 may be a flexible display screen, disposed on a curved surface or a folded surface of the terminal 1000. Even, the touch display screen 1005 may be further set in a non-rectangular irregular pattern, namely, a special-shaped screen. The touch display screen 1005 may be prepared by using materials such as a liquid crystal display (LCD), an organic light-emitting diode (OLED), or the like.

The power supply 1009 is configured to supply power to assemblies in the terminal 1000. The power supply 1009 may be an alternating current, a direct current, a primary battery, or a rechargeable battery. When the power supply 1009 includes the rechargeable battery, the rechargeable battery may be a wired rechargeable battery or a wireless rechargeable battery. The rechargeable battery may be further configured to support a fast charge technology.

A person skilled in the art may understand that the structure shown in FIG. 12 does not constitute a limitation to the terminal 1000, and the terminal may include more or fewer components than those shown in the figure, or some components may be combined, or a different component deployment may be used.

In an exemplary embodiment, a non-transitory computer-readable storage medium, for example, a memory including at least one program code is further provided. The at least one program code may be executed by a processor in a terminal to implement the virtual object control method in the foregoing embodiments. For example, the computer-readable storage medium may be a read-only memory (ROM), a RAM, a compact disc read-only memory (CD-ROM), a magnetic tape, a floppy disk, an optical data storage device, or the like.

In an exemplary embodiment, a computer program product or a computer program is provided. The computer program product or the computer program includes computer instructions, and the computer instructions are stored in a non-transitory computer-readable storage medium. A processor of a computer device reads the computer instructions from the computer-readable storage medium, and executes the computer instructions, so that the computer device performs the virtual object control method provided in the foregoing implementations.

What is claimed is:

1. A virtual object control method, the method comprising:
    obtaining a skill type of a skill in response to a first touch user operation on a skill control;
    displaying, in response to determining that the obtained skill type of the skill is a target skill, a castable region of the skill in a virtual scene according to a position where a controlled virtual object is located and a casting range of the skill, the target skill being a skill that supports selecting a casting position based on a second touch user operation;
    displaying a casting countdown of the skill in the virtual scene in response to the skill being the target skill; and
    controlling, during the casting countdown and in response to the second touch user operation in the castable region, the controlled virtual object to cast the skill at the casting position on which the second touch user operation is performed.

2. The method according to claim 1, wherein the controlling further comprises:
    obtaining screen coordinates of the casting position indicated by the second touch user operation on a screen in response to the second touch user operation in the castable region;
    mapping the obtained screen coordinates into scene coordinates of the casting position in the virtual scene; and
    controlling the controlled virtual object to cast the skill at the scene coordinates.

3. The method according to claim 1, wherein the method further comprises:
    determining, in response to a third touch user operation on a map control, a target region in the map control;
    displaying a target scene corresponding to the target region in the virtual scene, the target scene comprising the castable region; and
    detecting the second touch user operation in the castable region in the target scene.

4. The method according to claim 1, wherein when the castable region is a round region, the displaying comprises:
    in the virtual scene, determining a position where the controlled virtual object is located as a center of the castable region, and determining a farthest casting distance of the skill as a radius of the castable region; and
    displaying a casting template of the castable region in the virtual scene, the casting template indicating that casting of the skill in a region outside the casting template is invalid.

5. The method according to claim 1, wherein the method further comprises:
    displaying the casting countdown and casting prompt information of the skill in the virtual scene in response to the skill being the target skill, the casting countdown including a duration in which a user has an option to cast the skill, the casting prompt information including text that instructs the user to execute the option by touching a screen to cast the skill.

6. The method according to claim 1, wherein the method further comprises:
    controlling, in response to a skill casting operation received on a wheel virtual joystick corresponding to the skill control, the controlled virtual object to cast the skill at a position indicated by the skill casting operation.

7. The method according to claim 1, wherein the method further comprises:
    when the first touch user operation on a screen is detected, obtaining, in response to presence of a user interface (UI) control at a position indicated by the first touch user operation, a control type of the UI control;
    obtaining triggered states of other skill controls in response to the control type of the UI control being the skill control corresponding to the skill, the other skill controls being skill controls of other skills different from the skill; and
    determining that the first touch user operation on the skill control is detected, in response to the other skill controls not being in triggered states.

8. The method according to claim 1, wherein the method further comprises:
    updating, in response to a drag operation in the castable region, the casting position indicated by the drag operation in the virtual scene based on a drag trajectory of the drag operation.

9. The method according to claim 1, wherein the controlling the controlled virtual object to cast the skill at the casting position further comprises:
    displaying a first skill circle at the casting position, the first skill circle identifying an influence range of a skill effect produced by casting the skill; and
    controlling the controlled virtual object to cast the skill in the first skill circle.

10. The method according to claim 9, wherein the skill is for producing a skill effect on a single target, and the first skill circle comprises at least two targets;
    the controlling the controlled virtual object to cast the skill in the first skill circle further comprises:
    determining a first target from the at least two targets in the first skill circle according to a target determining principle; and
    controlling the controlled virtual object to cast the skill to produce the skill effect on the first target; and the target determining principle comprising a principle of nearest distance first, a principle of lowest health point first, and a principle of lowest health bar first.

11. The method according to claim 1, further comprising:
controlling, in response to a framing operation received in the castable region, the controlled virtual object to cast the skill in a casting region defined by the framing operation, the framing operation defining a closed pattern in the castable region based on a drag trajectory, the casting region being the closed pattern, or the casting region being a smallest enclosing circle of the closed pattern.

12. The method according to claim 11, wherein the controlling the controlled virtual object to cast the skill in the casting region defined by the framing operation further comprises:
calculating a region area of the casting region defined by the framing operation in response to the framing operation received in the castable region; and
controlling the controlled virtual object to cast the skill in the casting region defined by the framing operation in response to the region area being less than an area threshold.

13. The method according to claim 12, wherein the controlling the controlled virtual object to cast the skill in the casting region defined by the framing operation in response to the region area being less than the area threshold further comprises:
displaying a second skill circle in the casting region in response to the region area being less than the area threshold, the second skill circle identifying an influence range of a skill effect produced by casting the skill, and a shape of the second skill circle being a same as the casting region; and
controlling the controlled virtual object to cast the skill in the second skill circle.

14. The method according to claim 13, wherein the skill is for producing a skill effect on a single target, and the second skill circle comprises at least two targets;
the controlling the controlled virtual object to cast the skill in the second skill circle further comprises:
determining a second target from the at least two targets in the second skill circle according to a target determining principle; and
controlling the controlled virtual object to cast the skill to produce the skill effect on the second target; and
the target determining principle comprising a principle of nearest distance first, a principle of lowest health point first, and a principle of lowest health bar first.

15. A virtual object control apparatus, comprising:
circuitry configured to:
obtain a skill type of a skill in response to a first touch user operation on a skill control;
cause to be displayed, in response to determining that the skill type of the skill is a target skill, a castable region of the skill in a virtual scene according to a position where a controlled virtual object is located and a casting range of the skill, the target skill being a skill that supports selecting a casting position based on a second touch user operation;
cause to be displayed a casting countdown of the skill in the virtual scene in response to the skill being the target skill; and
control, during the casting countdown and in response to the second touch user operation in the castable region, the controlled virtual object to cast the skill at the casting position on which the second touch user operation is performed.

16. The apparatus according to claim 15, wherein the circuitry is further configured to:
obtain screen coordinates of the casting position indicated by the second touch user operation in a screen in response to the second touch user operation in the castable region;
map the obtained screen coordinates into scene coordinates of the casting position in the virtual scene; and
control the controlled virtual object to cast the skill at the scene coordinates.

17. The apparatus according to claim 15, wherein the circuitry is further configured to:
determine, in response to a third touch user operation on a map control, a target region in the map control;
display a target scene corresponding to the target region in the virtual scene, the target scene comprising the castable region; and
detect the second touch user operation in the castable region in the target scene.

18. The apparatus according to claim 15, wherein the circuitry is further configured to, when the castable region is a round region:
in the virtual scene, determine the position where the controlled virtual object is located as a center of the castable region, and determine a farthest casting distance of the skill as a radius of the castable region; and
display a casting template of the castable region in the virtual scene, the casting template indicating that casting of the skill in a region outside the casting template is invalid.

19. A terminal, comprising processing circuitry and one or more memories, the one or more memories storing at least one program code, the at least one program code being loaded and executed by the processing circuitry to implement the virtual object control method according to claim 1.

20. A non-transitory computer-readable storage medium, storing at least one program code, the at least one program code when executed by processing circuitry cause the processing circuitry to perform:
obtaining a skill type of a skill in response to a first touch user operation on a skill control;
displaying, in response to determining that the obtained skill type of the skill is a target skill, a castable region of the skill in a virtual scene according to a position where a controlled virtual object is located and a casting range of the skill, the target skill being a skill that supports selecting a casting position based on a second touch user operation;
displaying a casting countdown of the skill in the virtual scene in response to the skill being the target skill; and
controlling, during the casting countdown and in response to the second touch user operation in the castable region, the controlled virtual object to cast the skill at the casting position on which the second touch user operation is performed.

* * * * *